(12) United States Patent
Zhu et al.

(10) Patent No.: US 6,619,549 B2
(45) Date of Patent: Sep. 16, 2003

(54) BAR CODE SYMBOL READING DEVICE HAVING INTELLIGENT DATA COMMUNICATION INTERFACE TO A HOST SYSTEM

(75) Inventors: Xuewen Zhu, Suzhou (CN); Kai Ji, Suzhou (CN); Aili Yang, Suzhou (CN); Congwei Xu, Suzhou (CN)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/960,247

(22) Filed: Sep. 21, 2001

(65) Prior Publication Data

US 2003/0057283 A1 Mar. 27, 2003

(51) Int. Cl.$^7$ ................................................. G06K 7/10
(52) U.S. Cl. .............................. 235/462.45; 235/462.25
(58) Field of Search ................... 235/462.25, 462.01, 235/462.02, 462.03–462.24, 462.26, 462.27–462.47, 472.01–472.03, 441, 454, 494, 375, 381

(56) References Cited

U.S. PATENT DOCUMENTS

| | | | |
|---|---|---|---|
| 3,956,615 A | * | 5/1976 | Anderson et al. ............. 705/72 |
| 4,500,933 A | | 2/1985 | Chan |
| 4,543,450 A | | 9/1985 | Brandt |
| 4,579,407 A | | 4/1986 | Shimada |
| 4,686,506 A | | 8/1987 | Farago |
| 4,694,182 A | | 9/1987 | Howard |

(List continued on next page.)

OTHER PUBLICATIONS

CYPRESS Preliminary enCoRe USB by, Cypress Semiconductor Corporation, 2000, p. 1–50.

Primary Examiner—Thien M. Le
(74) Attorney, Agent, or Firm—Thomas J. Perkowski, Esq., P.C.

(57) ABSTRACT

An improved bar code symbol reading device includes a data transmission subsystem, operably coupled to a bar code reading engine, that communicates symbol character data to the communication interface of a host system over a communication link therebetween. During an interface configuration mode, the data transmission subsystem automatically cycles though at least one of a plurality of different communication interfaces (implemented by the subsystem) to test if the given communication interface corresponds to the communication interface of the host system. If this test is successful, subsequent data communication between the bar code symbol reading device and the host system is enabled over the active communication interface. In this manner, the data transmission subsystem is able to automatically configure itself for communication to the host system, and is capable of interfacing to a variety of different host devices in an automatic and error free manner with minimal human involvement.

61 Claims, 14 Drawing Sheets

U.S. PATENT DOCUMENTS

| | | | | |
|---|---|---|---|---|
| 4,699,447 A | | 10/1987 | Howard | |
| 4,820,193 A | | 4/1989 | Noorily | |
| 4,861,972 A | | 8/1989 | Elliott et al. | |
| 4,866,257 A | | 9/1989 | Elliott et al. | |
| 4,866,661 A | * | 9/1989 | de Prins | 235/382 |
| 4,868,375 A | | 9/1989 | Blanford | |
| 4,889,497 A | | 12/1989 | Riches | |
| 4,894,522 A | | 1/1990 | Elliott | |
| 4,902,244 A | | 2/1990 | Endo et al. | |
| 4,915,639 A | | 4/1990 | Cohn et al. | |
| 4,930,848 A | | 6/1990 | Knowles | |
| 4,941,845 A | | 7/1990 | Eppley et al. | |
| 4,954,101 A | | 9/1990 | Nelson | |
| 4,972,470 A | | 11/1990 | Farago | |
| 5,040,993 A | | 8/1991 | Krug et al. | |
| 5,081,342 A | | 1/1992 | Knowles et al. | |
| 5,092,793 A | | 3/1992 | Stephan | |
| 5,179,270 A | | 1/1993 | Taussig et al. | |
| 5,181,858 A | | 1/1993 | Matz et al. | |
| 5,200,597 A | | 4/1993 | Eastman et al. | |
| 5,214,268 A | | 5/1993 | Doing | |
| 5,222,164 A | | 6/1993 | Bass et al. | |
| 5,250,792 A | | 10/1993 | Swartz et al. | |
| 5,258,604 A | | 11/1993 | Behrens et al. | |
| 5,330,370 A | | 7/1994 | Reddersen et al. | |
| 5,347,113 A | | 9/1994 | Reddersen et al. | |
| 5,548,510 A | | 8/1996 | Ebert et al. | |
| 5,563,402 A | | 10/1996 | Reddersen et al. | |
| 5,592,560 A | * | 1/1997 | Deaton et al. | 382/100 |
| 5,640,002 A | * | 6/1997 | Ruppert et al. | 235/462.46 |
| 5,664,229 A | | 9/1997 | Bhargava et al. | |
| 5,675,139 A | | 10/1997 | Fama | |
| 5,703,347 A | | 12/1997 | Reddersen et al. | |
| 5,745,794 A | | 4/1998 | Poloniewicz et al. | |
| 5,789,728 A | | 8/1998 | Barile et al. | |
| 5,875,415 A | | 2/1999 | Lieb et al. | |
| 5,905,249 A | | 5/1999 | Reddersen et al. | |
| 5,979,766 A | | 11/1999 | Rockstein et al. | |
| 6,098,877 A | | 8/2000 | Barkan et al. | |
| 6,109,614 A | * | 8/2000 | Ciarcia | 273/372 |
| 6,115,678 A | | 9/2000 | Lieb et al. | |
| 6,149,063 A | * | 11/2000 | Reynolds et al. | 235/472.02 |
| 6,283,375 B1 | | 9/2001 | Wilz et al. | |
| 2002/0060247 A1 | * | 5/2002 | Krishnaswamy et al. | 235/472.01 |

* cited by examiner

| 10-Pin Connector (USB) | |
|---|---|
| Pin | Function |
| 1 | Ground |
| 2 | D- |
| 3 | D+ |
| 4 | No Connection |
| 5 | No Connection |
| 6 | No Connection |
| 7 | PC+5V/V_USB |
| 8 | No Connection |
| 9 | No Connection |
| 10 | Shield Ground |

| USB Cable Connector | |
|---|---|
| Pin | Function |
| 1 | PC+5V/V_USB |
| 2 | D- |
| 3 | D+ |
| 4 | Ground |
| 5 | Shield Ground |

| 10-Pin Connector (RS-232) ||
|---|---|
| Pin | Function |
| 1 | Ground |
| 2 | RS-232 Transmit Output |
| 3 | RS-232 Receive Input |
| 4 | RTS Output |
| 5 | CTS Input |
| 6 | DTR Input |
| 7 | No Connection |
| 8 | No Connection |
| 9 | +5VDC |
| 10 | Shield Ground |

| RS-232 Cable Connector ||
|---|---|
| Pin | Function |
| 1 | Shield Ground |
| 2 | RS-232 Transmit Output |
| 3 | RS-232 Receive Input |
| 4 | DTR Input |
| 5 | Power/Signal Ground |
| 6 | Light Pen Data |
| 7 | CTS Input |
| 8 | RTS Output |
| 9 | +5VDC* |

| 10-Pin Connector (KBW) ||
|---|---|
| Pin | Function |
| 1 | Ground |
| 2 | No Connection |
| 3 | No Connection |
| 4 | PC Data |
| 5 | PC Clock |
| 6 | KB Clock |
| 7 | +5V DC |
| 8 | KB Data |
| 9 | V_EXT |
| 10 | No Connection |

| 5-Pin Female DIN ||
|---|---|
| Pin | Function |
| 1 | Keyboard Clock |
| 2 | Keyboard Data |
| 3 | No Connection |
| 4 | Power Ground |
| 5 | +5 Volts DC |

| 6-Pin Male Mini-DIN ||
|---|---|
| Pin | Function |
| 1 | PC Data |
| 2 | No Connection |
| 3 | Power Ground |
| 4 | +5 Volts DC |
| 5 | PC Clock |
| 6 | No Connection |

# BAR CODE SYMBOL READING DEVICE HAVING INTELLIGENT DATA COMMUNICATION INTERFACE TO A HOST SYSTEM

BACKGROUND OF THE INVENTION

1. Field of the Invention

The present invention relates to bar code symbol reading devices that provide data to one or more host systems (for example, personal computers, point-of-sale (POS) stations, inventory management systems, document tracking systems, package tracking (and routing and delivery) systems, other retail solutions (such as price look-up kiosks), etc.)

2. Brief Description of the Prior Art

Bar code symbols have become widely used in many environments such as, for example, as a form of data input to personal computers, point-of-sale (POS) stations, inventory management systems, document tracking system, package tracking (and routing and delivery) systems, other retail solutions (such as price look-up kiosks), a diverse range of data acquisition and control applications, etc.). To meet the growing demands of this technological innovation, bar code symbol readers of various types have been developed for reading bar code symbols and producing symbol character data for use as input in such automated data processing systems.

In general, it is desirable to enable a bar code symbol reading device to interface to a variety of different host devices. This feature allows the bar code symbol reading device to be used in a variety of applications that utilize such different host devices. Moreover, it is desirable to make the configuration of such an interface automatic with minimal human involvement.

Heretofore, several mechanisms for interfacing bar code symbol reading devices to host systems have been proposed.

Many commercially available bar code symbol reading devices distribute configuration manuals (or guides) that include bar code labels for different device-host configurations (and parameters). The bar code labels encode data, which is read by the bar code scanning device and used in an internal configuration routine to select and configure the interface between the bar code scanning device and the host system. Whenever the user desires to use the scanning device with a different host system, the user must locate the appropriate guide/label and read the data encoded by the label, which may be problematic in the event that the user has misplaced (or lost) the guide/label or an error occurs in the label reading operation.

In U.S. Pat. No. 5,258,604, a system is disclosed which implements a bar code scanning device which is configured to accept any of a plurality of differently configured interface boards in its handle, wherein each type of interface board is specially adapted to mate with an associated host device. The decoder in the scanner polls the interface board upon power-up and reads an identification code from the particular interface board which the user has inserted. The identification code is used by the decoder to access configuration and formatting data from an on-board memory in order to transmit data to the interface board and ultimately to the host device in the required manner. This requires a user to have to swap electrical boards inside the scanner device whenever he desires to use the scanner with a different host device, which is unwieldy and potentially damaging to the boards due to electrostatic discharge (ESD) phenomena.

In U.S. Pat. No. 5,875,415, a system is disclosed which implements a bar code scanning device that formats bar code symbol character data into a specific SDCI data format. An interface cable, which is specific to a given type of host device, includes a host protocol and translation means that configures the bar code symbol data in the SDCI format into a format required by the given type of host device and transmits such data to the host device. Note that each different type of host device will require the use of a differently configured interface cable in order to enable communication between the bar code scanning device and host device, thus greatly increasing the cost of the interface cables themselves. Moreover, whenever the user desires to use the scanning device with a different host system, the user must locate (or purchase) the appropriate interface cable, which may be problematic and costly in the event that the user has misplaced (or lost) the required interface cable.

In U.S. Pat. No. 5,905,249, a system is disclosed which provides different connecting cables and labels for different bar code scanning devices/host system pairs. The labels are bar code labels (or RFID tags) that encode data which is read by the bar code scanning device and used in an internal configuration routine to configure the parameters of the interface between the bar code scanning device and the host system, such as baud rate, data format settings, hardware land software handshaking, UPC data format, etc.). Whenever the user desires to use the scanning device with a different host system, the user must locate (or purchase) the appropriate interface cable/label and read the data encoded by the label, which may be problematic in the event that the user has misplaced (or lost) the label for the cable or an error occurs in the label leading operation.

Thus, there is a great need in the art for a bar code reading device with an improved communication interface that enable the bar code symbol reading device to interface to a variety of different host devices in an automatic and error free manner with minimal human involvement.

OBJECTS AND SUMMARY OF THE INVENTION

Accordingly, it is a primary object of the present invention to provide an improved method of and device for reading bar code symbols that performs automatic configuration of a communication interface of the device to thereby enable a data communication link between the device and a host system, while overcoming the above described shortcomings and drawbacks of prior art devices and techniques.

A further object of the present invention is to provide such a device that implements a plurality of different communication interfaces and operates, during an interface configuration mode, to automatically select at least one of the plurality of different communication interfaces and test each selected communication interface to ascertain if the given communication interface corresponds to the communication interface of the host system.

A further object of the present invention is to provide a device that carries out such automatic interface configuration operations when the device is initially powered up.

A further object of the present invention is to provide a device that carries out such automatic interface configuration operations to enable subsequent data communication between the device and the host system.

It is yet another object of the present invention to provide a device that carries out such automatic interface configuration operations to provide a versatile bar code symbol reading device that is capable of operably interfacing to a plurality of diverse host systems with minimal human involvement in configuring such diverse interfaces.

It is yet another object of the present invention to provide a device that carries out such automatic interface configuration operations, in which the enabled communication interface of the device and the communication interface of the host system provides a wireless data link (such as an infra-red link, a Bluetooth RF link, and an IEEE 802.11b RF link) between the device and the host system.

A further object of the present invention is to provide a device that carries out such automatic interface configuration operations, in which the enabled communication interface of the device and the communication interface of the host system provides a wired serial data link (such as a keyboard wedge link, an RS-232 link, USB link, an IEEE 1394 link, an RS-422 link, and a RS-485 link) between the device and the host system.

A further object of the present invention is to provide a device that carries out such automatic interface configuration operations, in which the enabled communication interface of the device and the communication interface of the host system provides a standard communication link (such an OCIA link, an IBM 46XX link, a Light Pen Emulation link, and a LTPN link) between the device and the host system.

It is yet another object of the present invention to provide a device that carries out such automatic interface configuration operations, in which the reading of a bar code symbol and subsequent communication of the symbol character data corresponding thereto to the host system occurs automatically without the need for human interaction to activate such operations.

A further object of the present invention is to provide a device that carries out such automatic interface configuration operations, in which the reading of the bar code symbol occurs automatically without the need for human interaction to activate such operation, and the subsequent transfer of the symbol data corresponding thereto to the host system is manually-activated by a user interaction with a data transmission switch.

A further object of the present invention is to provide a device that carries out such automatic interface configuration operations, in which the reading of the bar code symbol and the subsequent transfer of the symbol data corresponding thereto to the host system is manually-activated by user interaction with a trigger mechanism.

It is yet another object of the present invention to provide a bar code symbol reading device that maintains a status register that stores information related to the establishment of a communication link between the device and a host system over a specific interface implemented by the device, and wherein the device reads the information stored in said status register during automatic configuration of the communication interfaces implemented by the device.

It is yet another object of the present invention to provide a bar code symbol reading device that maintains a status register that stores information indicative of the exchange of determined data packets in an enumeration sequence that establishes a communication link between the device and a host system over a specific interface implemented by the device, and wherein the device reads the information stored in said status register during automatic configuration of the communication interfaces implemented by the device.

It is yet another object of the present invention to provide a bar code symbol reading device that tests the signal levels of a given communication interface implemented by the device during automatic configuration of the communication interfaces implemented by the device.

It is yet another object of the present invention to embody a subsystem that carries out such automatic interface configuration operations in a wand-type scanner, hand-held scanner, presentation scanner, electronic cash register systems and other point-of-sale terminals, other retail solutions such as price look-up kiosks, and data acquisition systems (for example, those involving inventory control, patient care in hospitals and other medical applications).

These and further objects of the present invention will become apparent hereinafter and in the claims to Invention.

BRIEF DESCRIPTION OF THE DRAWINGS

For a fuller understanding of the Objects of the Present Invention, the Detailed Description of the Illustrated Embodiments of the Present Invention should be read in conjunction with the accompanying drawings, wherein.

DETAILED DESCRIPTION OF THE ILLUSTRATIVE EMBODIMENTS OF THE PRESENT INVENTION

Figure 1:
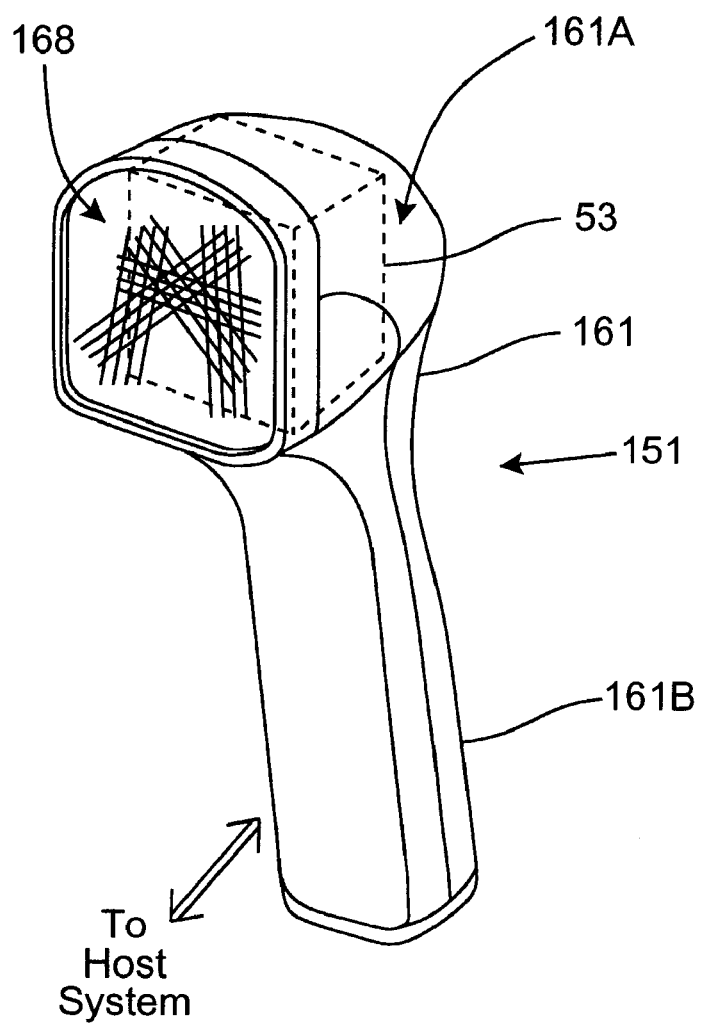
FIG. 1 is a plan view of an exemplary hand-holdable laser scanning bar code symbol reading device that embodies the present invention.

Referring to the figures in the accompanying Drawings, the various illustrative embodiments of the bar code symbol reading system of the present invention will be described in great detail, wherein like elements will be indicated using like reference numerals.

An exemplary hand-holdable laser scanning bar code symbol reading device 151 is shown in FIG. 1. The device 151 includes a hand-supportable housing 161 having a head portion 161A that encloses a bar code symbol reading engine 53 that produces a laser scanning pattern (which may be an multi-line omni-directional pattern or a single line pattern) passing through light transmission window 168 for the purpose of scanning bar code symbols on objects located proximate to the laser scanning pattern, while preventing unintentional scanning of bar code symbols on objects located outside thereof. After the successful reading of a bar code symbol by the engine 53, symbol character data (corresponding to the same bar code symbol) is transmitted from the engine 53 to a host system (e.g. electronic cash register system, data collection device, or other data storage/processing device, etc.) over a communication link therebetween (which, for example, may be a wireless data link (such as an infra-red link, Bluetooth RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, an IBM 46XX link, a Light Pen Emulation link, a LTPN link)).

The reading of a bar code symbol and subsequent transfer to the host system of the symbol character data corresponding thereto may occur automatically (without the need for human interaction to activate such operations). Alternatively, the reading of the bar code symbol may occur automatically (without the need for human interaction to activate such operation) and the subsequent transfer to the host system of the symbol data corresponding thereto may be activated by a manually-activated data transmission switch as described in detail in co-pending U.S. patent application Ser. No. 09/204,176 filed Dec. 3, 1998 (108-027USA000) and co-pending U.S. patent application Ser. No. 09/452,976 filed Dec. 2, 1999 (108-078USA000); incorporated by reference above in their entirety. In another alternative, the reading of the bar code symbol and subsequent transfer to the host system of the symbol data corresponding thereto may be activated by a manual trigger or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798; 5,484,992; 5,468,951; 5,425,525; 5,240,971; 5,340,973; 5,260,553; incorporated herein by reference.

Figure 2:
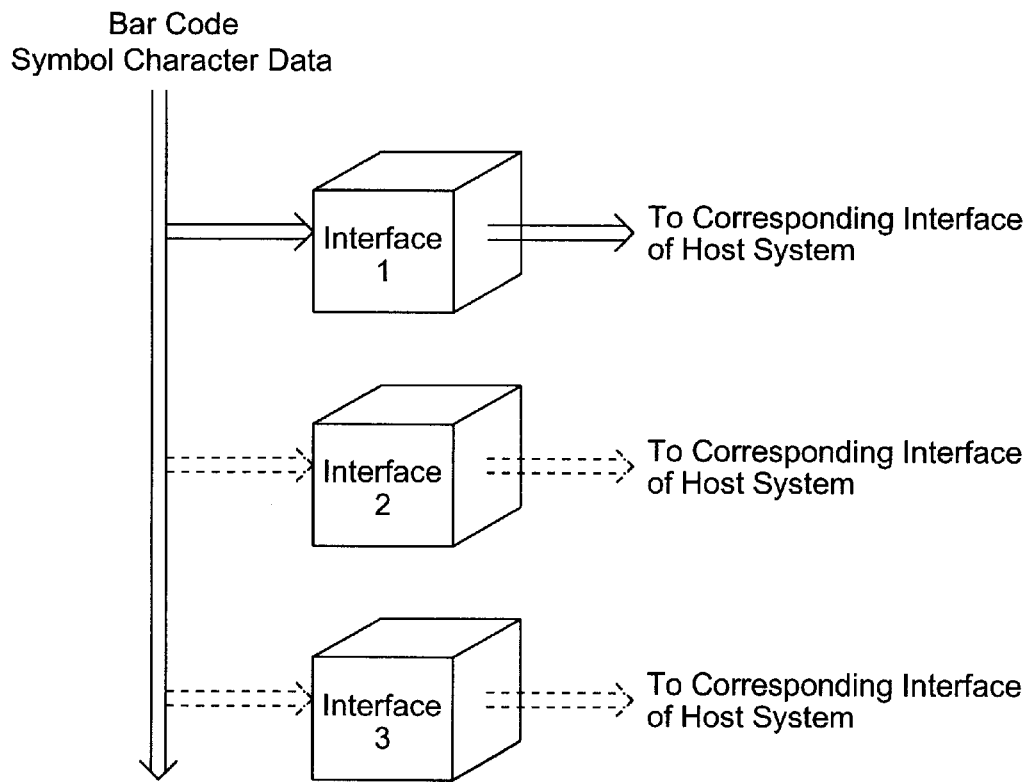
FIG. 2 is a pictorial illustration of a data transmission subsystem which is embodied with the bar code symbol reading device of FIG. 1 to provide automatic configuration of the communication interface between the bar code symbol reading device and a host system according to the present invention.

According to the present invention, the data transmission subsystem of the bar code symbol reading device 151, which is responsible for transmitting symbol character data from the device 151 to the host system, implements a plurality of different interfaces as shown in FIG. 2. During system configuration, an operator couples the device 151 to a host system that includes an interface corresponding to (i.e., suitable for communication with) one interface of the plurality of different interfaces implemented by the device 151. During an interface configuration mode of operation, which is preferably carried out when the device 151 is initially powered up, the data transmission subsystem automatically cycles though one or more of the interfaces implemented therein whereby, for a given interface, the data transmission subsystem selectively activates the given interface (while disabling the other interfaces) and tests the communication link between the given interface and the host system to ascertain if the given interface corresponds to the interface of the host system. In other words, the data transmission subsystem automatically selects at least one of the plurality of different interfaces implemented therein and tests each selected interface to ascertain if the selected interface corresponds to the communication interface of the host system. Upon detecting that given interface corresponds to the interface of the host system, the interface configuration mode of operation ends, thereby enabling data communication between the bar code symbol reading device 151 and the host system over the given interface. In this manner, the data transmission subsystem of bar code symbol reading device 151 is able to automatically configure itself such that its interface is suitable for communication to the interface of the host system. Moreover, the bar code symbol reading device is thus capable of interfacing to a variety of different host devices in an automatic and error free manner with minimal human involvement, thus providing significant advantages over the prior art bar code symbol reading devices.

For example, consider the configuration shown in FIG. 2 wherein an operator, during system configuration, couples the device 151 to a host system that includes an interface corresponding to interface 1 of device 151. During the interface configuration mode of operation, the bar code symbol reading device 151 automatically cycles though one or more of the interfaces implemented by the device 151. During one such cycle, the device 51 selectively inactivates interface 1 (while disabling the other interfaces 2 and 3) and tests the communication link between the interface 1 and the host system to ascertain if interface 1 corresponds to interface of the host system. Upon detecting that interface 1 corresponds to the interface of the host system, the interface configuration mode of operation ends, thereby enabling data communication between the bar code symbol reading device 151 and the host system over interface 1. Note that the dotted lines of FIG. 2 represent inactive communication paths that result from such interface configuration operations.

Figure 3:
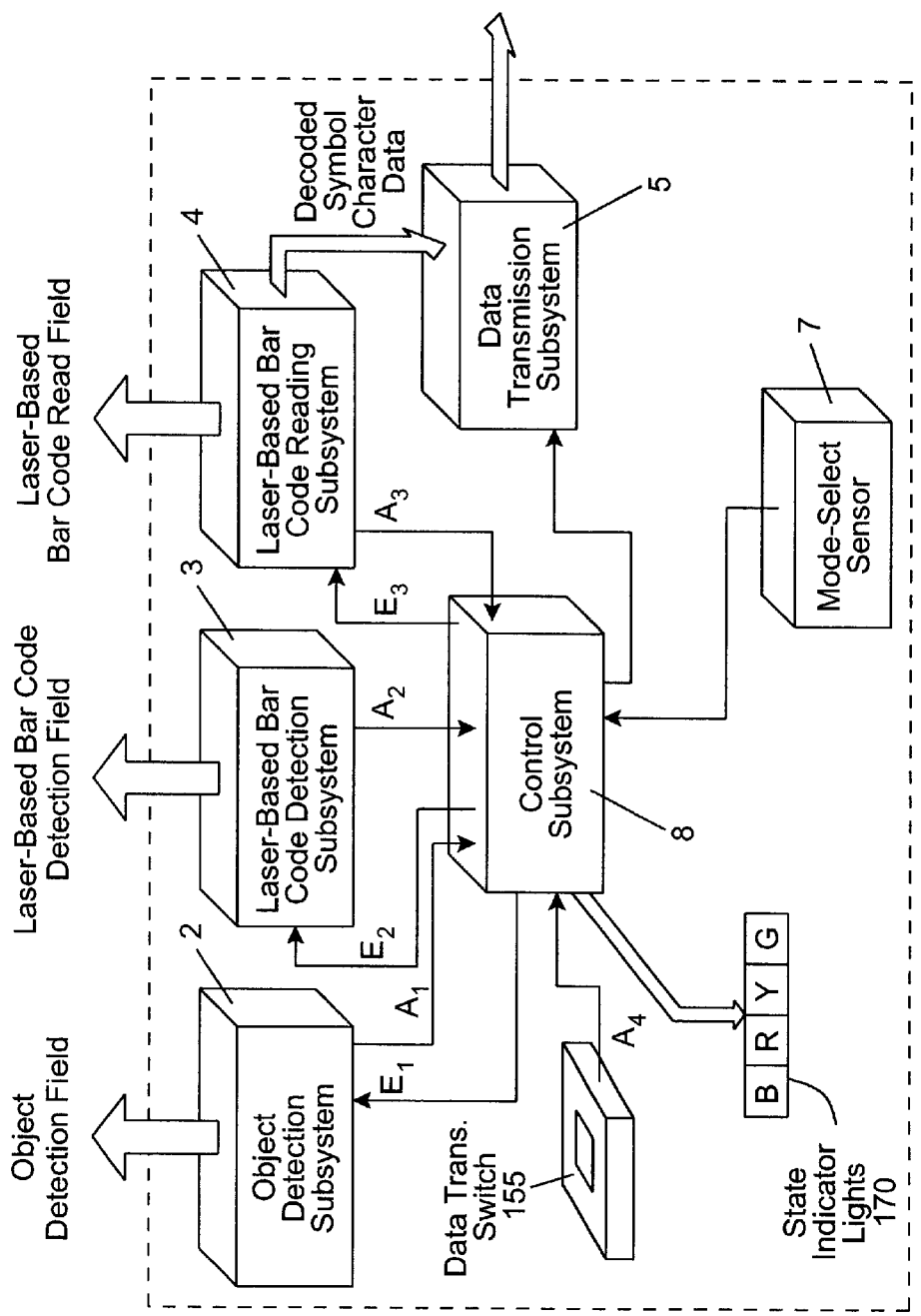
FIG. 3 is a logical block diagram of a generalized system design of a laser-based bar code symbol reading device according to the present invention, including: an object detection subsystem 2; a laser-based bar code symbol detection subsystem 3; a laser-based bar code symbol reading subsystem 4; a data transmission subsystem 5; a state indication subsystem 6; a data transmission activation switch 155 integrated with the scanner housing in part or whole; a mode-selection switch or sensor 7 integrated with the scanner housing in part or whole; and a system control subsystem 8 operably connected to the other subsystems described above. In general, the bar code symbol reading device has a number of preprogrammed operational states (or modes), namely: an Interface Configuration State; an Object Detection State; a Bar Code Symbol Detection State; a Bar Code Symbol Reading State; and a Data Transmission State.

A generalized system design of a laser-based bar code symbol reading device 151' according to the present invention is shown in FIG. 3, including: an object detection subsystem 2; a laser-based bar code symbol detection subsystem 3; a laser-based bar code symbol reading subsystem 4; a data transmission subsystem 5; a state indication subsystem 6; a data transmission activation switch 155 integrated with the housing in part or whole; a mode-selection switch or sensor 7 integrated with the housing in part or whole; and a system control subsystem 8 operably connected to the other subsystems described above. In general, device 151' has a number of reprogrammed operational states (or modes), namely: an Interface Configuration State; an Object Detection State; a Bar Code Symbol Detection State; a Bar Code Symbol Reading State; and a Data Transmission State.

The data transmission subsystem 5 operates in the Interface Configuration State to automatically cycle though one or more of the interfaces implemented by the data transmission subsystem 5 whereby, for a given interface, the data transmission subsystem 5 selectively activates the given interface (while disabling the other interfaces) and tests the communication link between the given interface and the host system to ascertain if the given interface corresponds to the interface of the host system. Upon detecting that given interface corresponds to the interface of the host system, the Interface Configuration State ends, thereby enabling data communication between the bar code symbol reading device 151' and the host system over the given interface. In this manner, the data transmission subsystem 5 of bar code symbol reading device 151' is able to automatically configure itself such that its communication interface is suitable for communication to the communication interface of the host system.

The object detection subsystem 2 operates in the Object Detection State to automatically detect if an object exists within the object detection field (which is proximate to the scanning field of the device 151) and automatically generate a first control activation signal $A_1$ indicative thereof (for example, $A_1=0$ is indicative that an object has not been detected within the object detection field, and $A_1=1$ is indicative that an object has been detected within the object detection field). As shown in FIG. 3, the first control activation signal $A_1$ is provided to the system control subsystem 8 for detection, analysis and programmed response. In general, the object detection subsystem 2 can utilize electromagnetic radiation or acoustical energy, either sensible or non-sensible by the operator, to automatically detect if an object exists within the object detection field.

For example, the object detection subsystem 2 may project a pulsed beam of infrared light from the housing 161 into the object detection field, which is a three-dimensional volumetric expanse spatially coincident with the pulsed infrared light beam. When an object within the object detection field is illuminated by the pulsed infrared light beam, infrared light reflected therefrom will be returned toward the housing 161, where it can be detected to derive an indication that an object exists within the object detection field.

Alternatively, the object detection subsystem 2 may project a pulsed laser beam of visible light from the housing 161 into the object detections filed, which is a three-dimensional volumetric expanse spatially coincident with the pulsed laser beam. When an object within the object detection field is illuminated by the pulsed laser beam, light reflected therefrom will be returned toward the housing 161, where it can be detected to derive an indication that an object exists within the object detection field. Details of exemplary object detection subsystems that implement this approach is described in U.S. Pat. No. 4,639,606 to Boles, et al, and U.S. Pat. No. 4,933,538 to Heiman, et al. herein incorporated by reference in their entirety.

Alternatively, the object detection subsystem 2 may project ultrasonic energy from the housing 161 into the object detection field, which is a three-dimensional volumetric expanse spatially coincident with such ultrasonic energy. When an object within the object detection field is illuminated by the ultrasonic energy, ultrasonic energy reflected there from will be returned toward the housing 161, where it can be detected to derive an indication that an object exists within the object detection field.

Alternatively, the object detection subsystem 2 may utilize a passive technique that utilizes ambient light to detect that an object exists in the object detection field. More specifically, when an object within the object detection field is illuminated by ambient light, light reflected therefrom will be returned toward the housing 161, where it can be detected to derive an indication that an object exists within the object detection field In addition, the object detection subsystem 2 may utilize two different modes of object detection: a long range mode of object detection and a short range mode of object detection.

The laser-based bar code symbol presence detection subsystem 3 operates in the Bar Code Symbol Detect State to automatically scan the scanning field (with an omni-directional multiple line scan pattern or a uni-directional single line scan pattern) to detect if a bar code is present with the scanning field of the device 151, and automatically generate a second control activation signal $A_2$ indicative thereof (for example, $A_2=0$ is indicative that a bar code is not present within the scanning region, and $A_2=1$ is indicative that a bar code is present within the scanning region). As shown in FIG. 3, the second control activation signal $A_2$ is provided to the system control subsystem 8 for detection, analysis and programmed response.

The bar code symbol detection subsystem 3 does not carry out a bar code symbol decoding process, but rather rapidly determines whether the received scan data signals represent a bar code symbol residing within the scan field. There are a number of ways in which to achieve bar code symbol detection. For example, the bar code symbol detection subsystem 3 may detect the first and second borders of the bar code symbol "envelope". This is achieved by first processing a digital scan data signal to produce digital "count" and "sign" data. The digital count data is representative of the measured time interval (i.e. duration) of each signal level occurring between detected signal level transitions which occur in the digitized scan data signal. The digital sign data, on the other hand, indicates whether the signal level between detected signal level transitions is either a logical "1", representative of a space, or a logical "0", representative of a bar within a bar code symbol. Using the digital count and sign data, the bar code symbol detection subsystem 3 identifies the first and second borders of the bar code envelope, and thereby determines whether or not the envelope of a bar code symbol is represented by the scan data collected from the scan field. When a bar code symbol envelope is detected, the bar code symbol detection subsystem 3 automatically generates a second control activation signal $A_2=1$, which is indicative that a bar code is present within the scanning region.

The bar code symbol detection subsystem 3 may utilize two different modes of bar code symbol detection, namely: a long-range mode of bar code symbol detection and a short-range node of bar code symbol detection as taught in U.S. Pat. No. 5,789,730, incorporated by reference herein in its entirety.

The laser-based bar code symbol reading subsystem 4 operates in the Bar Code Symbol reading State to automatically scan the scanning field (with an omni-directional multiple line scan pattern or a uni-directional single line scan pattern) to detect and decode bar code symbols on objects therein, produce bar code symbol character data representative of the detected and decoded bar code symbol, and automatically generate a third control activation signal $A_3$ indicative of a successful decoding operation (for example, $A_3=0$ is indicative that a successful decoding operation has not occurred, and $A_3=1$ is indicative that a successful decoding operation has occurred). As shown in FIG. 3, the third control activation signal $A_3$ is provided to the system control subsystem 8 for detection, analysis and programmed response.

The data transmission subsystem 5 operates in the Data Transmission State to automatically transmit symbol character data (produced by the operation of the bar code symbol reading subsystem 4 in the Bar Code Symbol Reading State as described above) to the host system (to which the bar code reading device 151 is connected or to some other data storage and/or processing device) over the communication link therebetween. The communication link between the bar code symbol reading device and the host system may include a wireless data link (such as an infra-red link, Bluetooth RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link).

A more detailed description of exemplary implementations of such subsystems is set forth in U.S. Pat. Nos. 5,789,730 and 5,979,766 to Rockstein et al., commonly assigned to assignee of the present invention, and herein incorporated by reference in their entirety.

Preferably, the operation of the data transmission system 5 in the Data Transmission State occurs when the system control subsystem 8 detects that either one of the following two conditions have been satisfied:

i) generation of the third control activation signal (e.g., $A_3=1$) within a predetermined time period, indicative that the bar code symbol has been read, and generation of data transmission control activation control signal (e.g., $A_4=1$) produced from data transmission activation switch 155 within a predetermined time frame, indicative that the user desires the produced bar code symbol character data to be transmitted to the host system or intended device; or ii) generation of the third control activation signal (e.g., $A_3=1$) within a predetermined time period, indicative that the bar code symbol has been read, and generation of fifth control activation signal $A_5$ (e.g., $A_5=1$).

Note that the mode-select sensor 7, in generating the fifth control activation signal ($A_5=1$) effectively overrides the data transmission switch 155, enabling the automatic transmission of bar code symbol character strings to the host system.

Within the context of the system design shown in FIG. 3, the primary function of the state-select sensor 7 is to generate the fifth control activation signal $A_5$, which selectively enables the automatic transmission of bar code symbol character strings to the host system.

In the preferred embodiment of the present invention, the bar code symbol reading device 151 of the present invention operates in automatic data transmission mode (e.g., $A_5=1$) as a hand-free presentation scanner whereby the operator passes objects and associated bar code symbols though the scanning field of the device 151 in order to automatically read the bar code symbols therein and automatically transmit corresponding bar code symbol character strings to the host system, and operates in the manually-activated data transmission mode (e.g., $A_5=0$) as a hands-on scanner whereby the operator positions the scanner so that an object and associated bar code symbol passes though the scanning field of the device 151 in order to automatically read the bar code symbol therein and then activate the transmission of the corresponding bar code symbol data string to the host computer upon timely manual activation (e.g., $A_4=1$) of the data transmission activation switch.

In an alternate embodiment, the mode select sensor 7 (and its associated control function in overriding the data transmission switch 155) can be omitted. In this case, the operation of the data transmission subsystem 5 in the Data Transmission State (in transmitting symbol character data produced in the Bar Code Symbol Reading State) occurs when the system control subsystem 8 detects that the following condition has been satisfied: generation of the third control activation signal (e.g., $A_3=1$) within a predetermined time period, indicative that the bar code symbol has been read, and generation of data transmission control activation control signal (e.g., $A_4=1$) produced from data transmission activation switch 155 within a predetermined time frame, indicative that the user desires the produced bar code symbol character data to be transmitted to the host system or intended device. In this configuration, the device 151 is not capable of operating as a hand-free presentation scanner (whereby the operator passes objects and associated bar code symbols though the scanning field of the device in order to automatically read the bar code symbols therein and automatically transmit corresponding bar code symbol character strings to the host system), yet operates solely in a manually-activated data transmission mode as a hands-on scanner whereby the operator positions the scanner so that an object and associated bar code symbol passes though the scanning field of the device 151 in order to automatically read the bar code symbol therein and then activate the transmission of the corresponding bar code symbol data string to the host computer upon timely manual activation (e.g., $A_4=1$) of the data transmission activation switch 155'.

The state-select sensor 7 may utilize a manual or automated mechanism (or both) in generating the fifth control activation signal $A_5$. The manual mechanism may include a manual two-state switch (e.g., button) mounted into the housing 161 of the device 151. In an initial configuration, the manual switch generates and provides the control signal $A_5=0$. When the user first presses the manual switch, the manual switch generates and provides the control signal $A_5=1$. And when the user presses the manual switch a second time, the manual switch generates and provides the control signal $A_5=0$. Similar to the operation of a push button light switch, subsequent presses of the manual switch follow this two-state activation sequence: $A_5=0$ to $A_5=1$ back to $A_5=0$. The automatic mechanism may include a sensor that detects whether the hand-holdable bar code symbol reading device 151 has been placed within a support stand (or placed on a countertop or like surface in those instances where it has been designed to do so) and automatically generates the control signal $A_5$ in response thereto. For example, the state-select sensor 7 may include a hall-effect sensor that automatically generates the signal $A_5=1$ upon detection that the hand-holdable bar code symbol reading device 151 has been placed within a support stand (or placed on a countertop or like surface in those instances where it has been designed to do so), and automatically generate the signal $A_5=0$ upon detection that the hand-holdable bar code symbol reading device 151 has been removed from the support stand (or lifted off the countertop or like surface in those instances where it has been designed to do so).

Within the context of the system design shown in FIG. 3, the state indication subsystem 6 produces visual indication (e.g. color-coded light) signals that are emitted from the scanner housing 161 to inform the user of the current state of operation of the system (e.g. "blue" to indicate the object detection state, "red" to indicate the bar code detection state, "yellow" to indicate the bar code reading state, and "green" to indicate the symbol character data transmission state). As will be described in greater detail hereinafter, such state indication signals provide the user with visual feedback on the states of operation of the system, thereby improving the intuitiveness and facility of operation of the system in diverse application environments.

Within the context of the system design shown in FIG. 3, the system control subsystem 8 performs the following primary functions: (i) automatically receiving control activation signals $A_1$, $A_2$, $A_3$, $A_4$ and $A_5$ (ii) automatically generating enable signals $E_1$, $E_2$, and $E_3$ and (iii) automatically controlling the operation of the other subsystems in accordance with a system control program carried out by the system control subsystem 8 during the various modes of system operation.

A more detailed description of such data transmission control operations is set forth in U.S. Pat. No. 6,283,375 to Wilz, Sr. et al., and pending U.S. patent application Ser. No. 09/452,976 filed Dec. 2, 1999, commonly assigned to assignee of the present invention, and herein incorporated by reference in their entirety.

Preferably, the laser-based bar code symbol detection subsystem 3 and the laser-based bar code symbol reading subsystem 4 share a common laser scanning platform that is capable of producing the laser scanning pattern and passing it through the light transmission window 168 of the device. The laser scanning pattern may be an omni-directional multiple line scan pattern or a uni-directional single line scan pattern. A variety of scanning platforms may be used to produce the laser scanning pattern. Generally, these platforms employ a laser diode, the light from which is focused and collimated to form a scanning beam. A scanning mechanism (such as a oscillating mirror, multi-faceted rotating mirror or rotating holographic disk) and typically one or more light folding mirrors produce the laser scan pattern and direct it through the light transmission window 168 of the device. Reflected laser light that returns back along the outgoing optical path is collected and directed to a detector, which generates electrical signals whose amplitude corresponds to the intensity of the returned light directed thereto. Notably, the scanning mechanism can be realized in a variety of different ways. Thus, the term "scanning mechanism" as used herein is understood as any means for moving, steering, swinging or directing the path of a light beam through space during system operation for the purpose of obtaining information relating to an object and/or a bar code symbol.

Figure 4A:
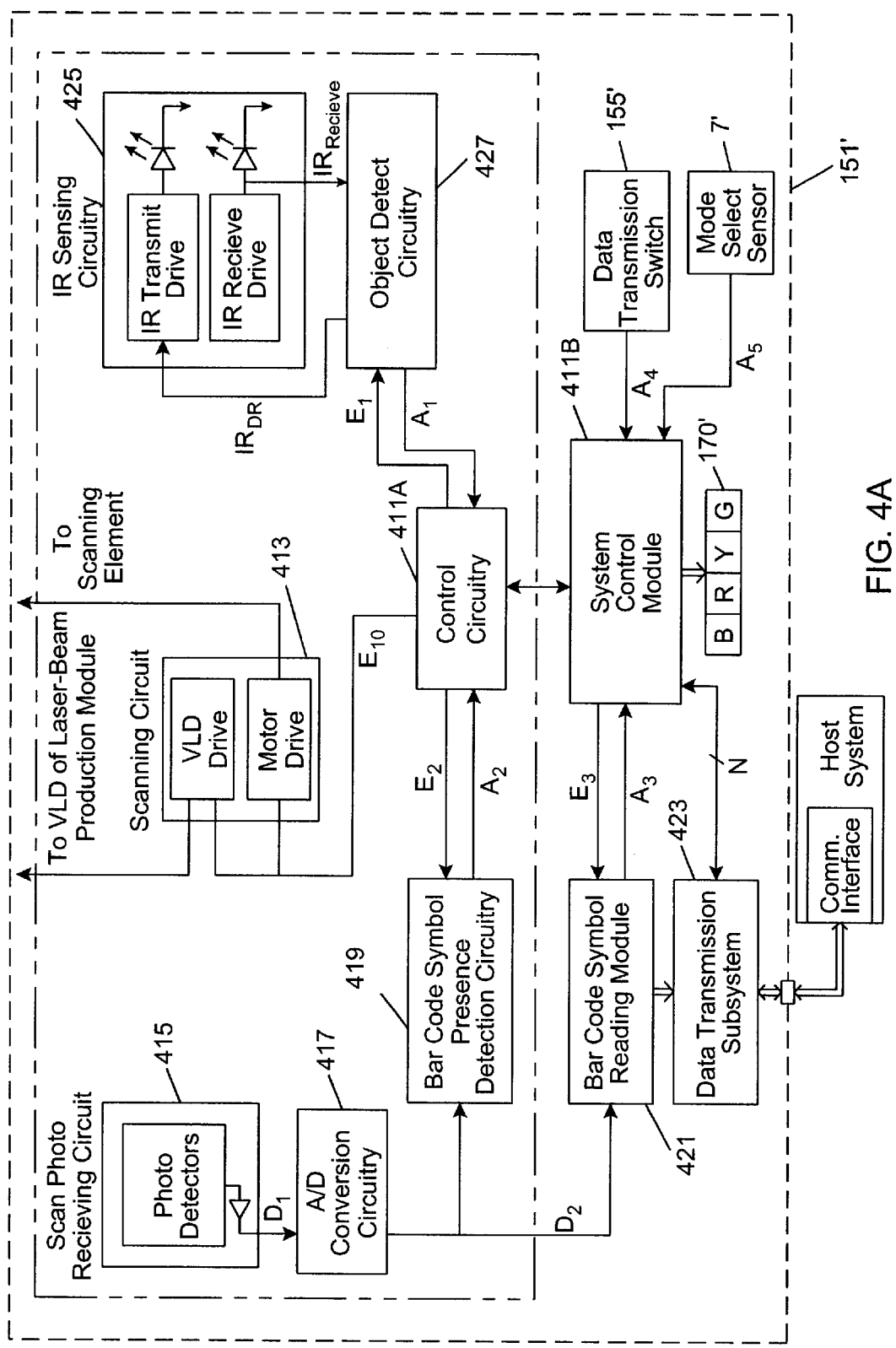
FIGS. 4A and 4B illustrate an exemplary system design and corresponding state diagram, respectively, of a bar code symbol reading device according to the present invention, including a number of cooperating components, namely: control circuitry 411A and a control module 411B that cooperate to perform system control operations to effectuate the system control as described herein; a scanning circuit 413 that drives the VLD and laser beam scanning mechanism to thereby produce the scan pattern of the visible laser beam; a scan photo-receiving circuit 415 (including one or more photodetectors and pre-amplification circuitry) for detecting laser light reflected off a scanned bar code symbol and producing an electrical signal $D_1$ indicative of the detected intensity; an analog-to-digital (A/D) conversion circuit 417 for converting analog scan data signal $D_1$ into a corresponding digital scan data signal $D_2$; a bar code symbol (presence) detection circuit 419 for processing digital scan data signal $D_2$ in order to automatically detect the digital data pattern of a bar code symbol on the detected object and produce control activation signal $A_2$; a symbol decoding module 421 for processing digital scan data signal $D_2$ so as to determine the data represented by the detected bar code symbol, generate symbol character data representative thereof, and produce activation control signal $A_3$; a data transmission subsystem 423 for transmitting data (including the symbol character data generated by the symbol decoding module) to the host system over the communication link therebetween, wherein the data transmission systems performs operations that automatically configure the communication interfaces implemented therein to enable data communication over the communication link between the device 151' and the host system; means (e.g. an object sensing circuit 425 and an object detection circuit 427) for producing a first activation control signal indicative of the detection of an object in at least a portion of the object detection field of the device; a manually-activatable data transmission switch 155' for generating control activation signal $A_4$ in response to activation of the switch; a mode select switch 7' for generating control activation signal $A_5$ in response to activation of the switch; and state indications (e.g. LEDs) 150' that provide a visible indication of the operating state (e.g., object detection state, a bar code symbol presence detection state, bar code symbol reading state, and data transmission state) of the device 151'.
Figure 4B:
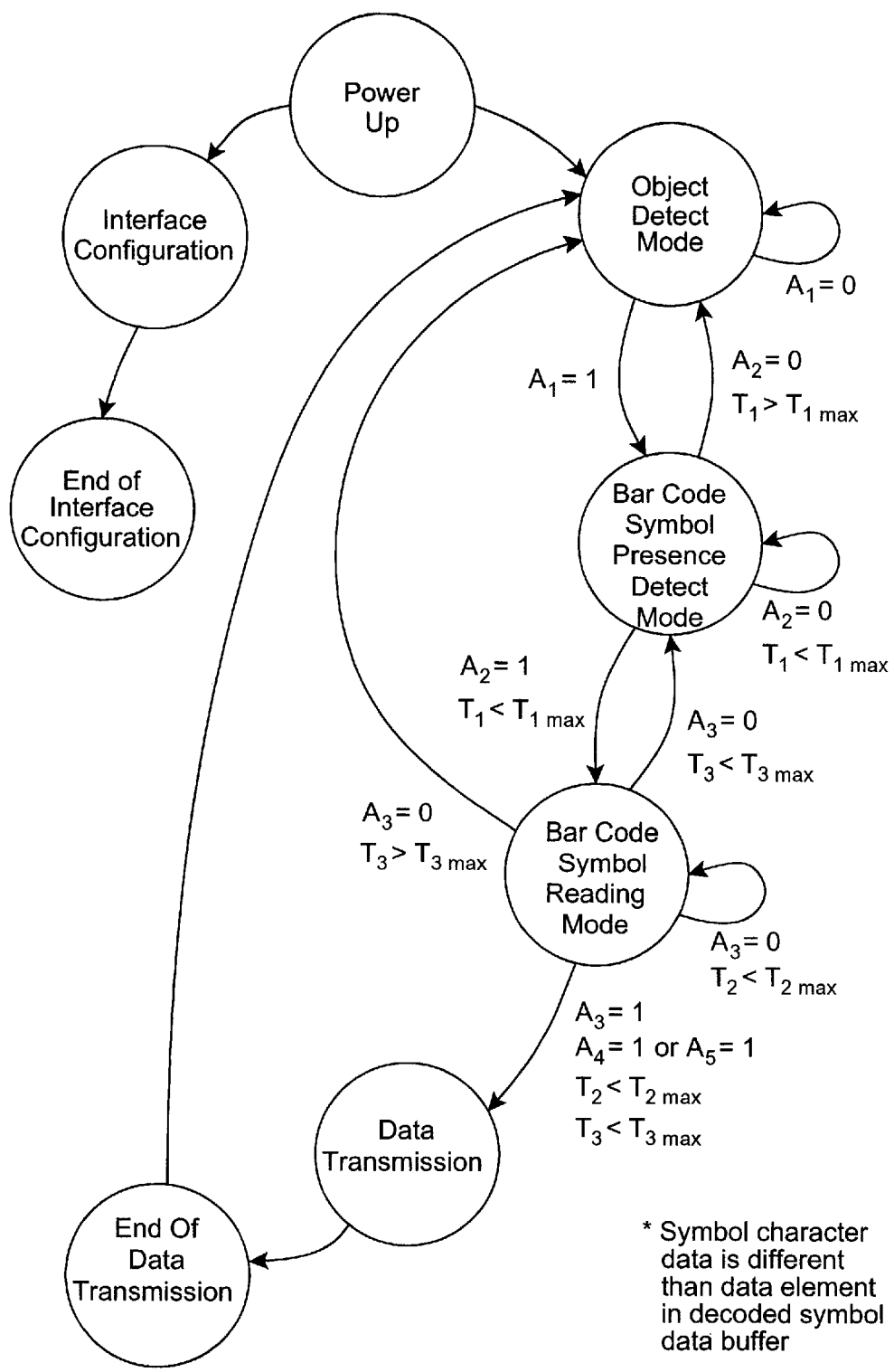

FIGS. 4A and 4B illustrate an exemplary system design of the bar code symbol reading device 151' according to the present invention including a number of cooperating components, namely: control circuitry 411A and a control module 411B that cooperate to perform system control operations to effectuate the system control as described herein; a scanning circuit 413 that drives the VLD and laser beam scanning mechanism to thereby produce the scan pattern of the visible laser beam; a scan photoreceiving circuit 415 (including one or more photodetectors and pre-amplification circuitry) for detecting laser light reflected off a scanned bar code symbol and producing an electrical signal $D_1$ indicative of the detected intensity, an analog-to-digital (A/D) conversion circuit 417 for converting analog scan data signal $D_1$ into a corresponding digital scan data signal $D_2$; a bar code symbol (presence) detection circuit 419 for processing digital scan data signal $D_2$ in order to automatically detect the digital data pattern of a bar code symbol on the detected object and produce control activation signal $A_2$; a symbol decoding module 421 for processing digital scan data signal $D_2$ so as to determine the data represented by the detected bar code symbol, generate symbol character data representative thereof, and produce activation control signal $A_3$; a data transmission subsystem 423 for transmitting data (including the symbol character data generated by the symbol decoding module) to the host system over the communication link therebetween; means (e.g. an object sensing circuit 425 and an object detection circuit 427) for producing a first activation control signal indicative of the detection of an object in at least a portion of the object detection field of the device; a manually-activatable data transmission switch 155' for generating control activation signal $A_4$ in response to activation of the switch; a mode select switch 7' for generating control activation signal $A_5$ in response to activation of the switch; and state indications (e.g. LEDs) 150' that provide a visible indication of the operating state (e.g., object detection state, a bar code symbol presence detection state, bar code symbol reading state, and data transmission state) of the device 151'. A more detailed description of such components is set forth in U.S. Pat. Nos. 5,789,730 and 5,979,766 to Rockstein et al., incorporated by reference above in their entirety.

As illustrated in the state diagram of FIG. 4B, upon system power up and initialization, the device enters the Interface Configuration State (or mode) and the Object Detect State.

In the Interface Configuration State, the data transmission subsystem 423 operates to automatically cycle though one or more of the interfaces implemented by the data transmission subsystem 423 whereby, for a given interface, the data transmission subsystem 423 selectively activates the given interface (while disabling the other interfaces) and tests the communication link between the given interface and the host system to ascertain if the given interface corresponds to the interface of the host system. In other words, the data transmission subsystem 423 automatically selects at least one of the plurality of different interfaces implemented therein and tests each selected interface to ascertain if the selected interface corresponds to the communication interface of the host system. Upon detecting that the given interface corresponds to the interface of the host system, the Interface Configuration State ends, thereby enabling data communication between the bar code symbol reading device 151' and the host system over the given interface. In this manner, the data transmission subsystem of bar code symbol reading device 151' is able to automatically configure itself such that its communication interface is suitable for communication to the communication interface of the host system.

In the Object Detect State, the control circuitry 411A automatically generates enable signal $E_1$=1 so as to enable object sensing circuit 425 and an object detection circuit 427. When an object is presented within the object detection field, the object is automatically detected by the object sensing circuit 425 and an object detection circuit 427. In response thereto, the object detection circuit 427 automatically generates a control activation signal $A_1$=1.

When control activation signal $A_1$=1 is detected by the control circuitry 411A, the system automatically enters the Bar Code Symbol Presence Detect state whereby the control circuitry 411A automatically activates the laser-based bar code symbol presence detection circuitry 419 by producing enable signal $E_2$=1. In addition, the control circuitry 411 A produces enable signal $E_{10}$=1, which enables the scanning circuit 413 to drive the VLD and scanning element, thereby generating a laser scanning pattern within the bar code detection field. When the laser scanning pattern scans a bar code symbol on the detected object, scan data signals are produced there from, collected by the scan photoreceiving circuit 415 and processed by the A/D conversion circuitry 417 and bar code symbol presence detection circuitry 419 to determine whether a bar code symbol is present within the bar code symbol detection field.

If the presence of a bar code symbol is detected within a predetermined time frame defined by timer T1, the system automatically enters the Bar Code Symbol Reading State whereby the system control module 411B automatically generates enable signal $E_3$=1 so as to activate the bar code symbol reading module 421. During such operations, the control circuitry 411A produces enable signal $E_{10}$=1, which enables the scanning circuit 413 to drive the VLD and scanning element, thereby generating a laser scanning pattern within the bar code reading field. When the laser scanning pattern scans a bar code symbol on the detected object, scan data signals are produced there from, collected by the scan photoreceiving circuit 415, processed by the A/D conversion circuitry 417, and decoded by code symbol reading module 421, thereby generating symbol character data representative of the decoded bar code symbol. Such symbol character data is buffered in memory (e.g., decoded symbol data buffer).

If the presence of a bar code symbol is not detected within the predetermined time frame defined by timer T1, the system returns to the Object Detect State whereby the control circuitry 411A automatically generates enable signal $E_1$=1 so as to enable the object sensing circuitry 425 and object detection circuitry 427.

In the Bar Code Symbol Reading State, if the detected bar code symbol is read (e.g., $A_3$=1), and the data transmission switch 155' is activated (e.g., $A_4$=1) or the mode select switch 7' activated (e.g., $A_5$=1) within a predetermined time frame defined by Timers T2 and T3, and the symbol character data is different that the data element stored in the decoded symbol data buffer, the system automatically enters the Data Transmission State; however, if the detected bar code symbol is not read (e.g., $A_3$=0) within a predetermined time frame defined by Timer T3, the system automatically returns to the Object Detect state.

In the Data Transmission State, in the event that the interface configuration operation was successful and communication is enabled between the data transmission subsystem 423 and the host system, the data transmission subsystem 423 automatically transmits the produced/buffered symbol character data to the host system over the communication link therebetween; however, in the event that the interface configuration operation failed and communication is not enabled between the data transmission subsystem 423 and the host system, communication of the produced/buffered symbol character data symbol character data from the data transmission subsystem 423 to the host system fails. The communication link between the bar code symbol reading device 151' and the host system may include a wireless data link (such as an infra-red link, Bluetooth RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link).

In an alternate embodiment, the mode select switch 7' (and its associated control function in overriding the data transmission switch 155') can be omitted. In this case, the operation of the data transmission system 423 in the Data Transmission State in transmitting symbol character data produced in the Bar Code Symbol Reading State occurs when the system control module 411B detects that the following condition has been satisfied: generation of the third control activation signal (e.g., $A_3=1$) within a predetermined time period, indicative that the bar code symbol has been read, and generation of data transmission control activation control signal (e.g., $A_4=1$) produced from data transmission activation switch 155' within a predetermined time frame, indicative that the user desires the produced bar code symbol character data to be transmitted to the host system or intended device. In this configuration, the device 151' is not capable of operating as a hand-free presentation scanner (whereby the operator passes objects and associated bar code symbols though the scanning field of the device in order to automatically read the bar code symbols therein and automatically transmit corresponding bar code symbol character strings to the host system), yet operates solely in a manually-activated data transmission mode as a hands-on scanner whereby the operator positions the scanner so that an object and associated bar code symbol passes though the scanning field of the device 151' in order to automatically read the bar code symbol therein and then activate the transmission of the corresponding bar code symbol data string to the host computer over the interface enabled during the Interface Configuration State upon timely manual activation (e.g., $A_4=1$) of the data transmission activation switch 155'.

When operating in the manner described above, the data transmission subsystem 423 of the bar code symbol reading device 151' is able to automatically configure itself such that its interface is suitable for communication to the communication interface of the host system. Moreover, the bar code symbol reading device 151' is capable of interfacing to a variety of different host devices in an automatic and error free manner with minimal human involvement, thus providing significant advantages over the prior art bar code symbol reading devices.

Figure 5:
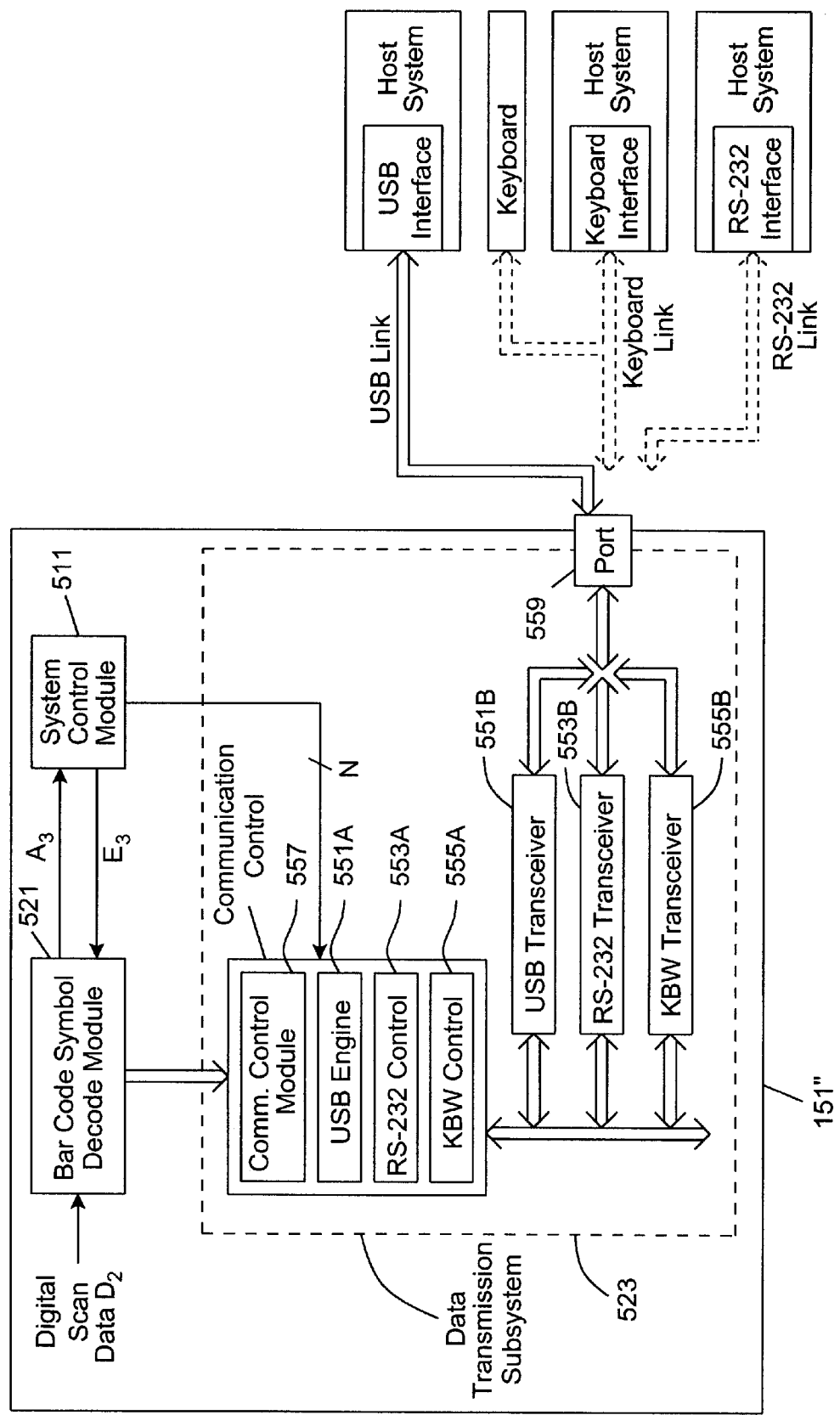
FIG. 5 is a functional block diagram that illustrates an embodiment of the data transmission subsystem of a bar code symbol reading device according to the present invention that supports automatic configuration of three exemplary wired serial interfaces (e.g., USB, RS-232, and KBW).

FIGS. 5 through 9C illustrate an embodiment of the data transmission subsystem of a bar code symbol reading device 151" according to the present invention that supports automatic configuration of three exemplary wired serial interfaces (e.g., USB, RS-232, and KBW). As shown in FIG. 5, the data transmission subsystem 523 includes USB interface circuitry (e.g., USB engine 551A and USB Transceiver 551B) that, when activated, provide a USB interface capable of data communication over a USB link between port 559 and the USB interface of a host system; RS-232 interface circuitry (e.g., RS-232 control 553A and RS-232 Transceiver 553B) that, when activated, provide an RS-232 interface capable of data communication over an RS-232 link between port 559 and the RS-232 interface of a host system; and KBW interface circuitry (e.g., KBW control 555A and KBW Transceiver 555B) that, when activated, provide a KBW interface capable of data communication over a keyboard link between port 559 and the keyboard interface of a host system. In addition, the data transmission subsystem includes a communication control module 557 that operates during an interface configuration mode (e.g., the Interface Configuration State as described above) to automatically configure the three serial interfaces (e.g., USB, RS-232, and KBW) implemented by the data transmission subsystem 523 as illustrated in the flow chart of FIGS. 6A and 6B. The operation of the data transmission subsystem 523 is controlled by system control module 511 (via control signals communicated over the N bit control bus as shown). In addition, as is conventional, the data transmission system 523 operates in conjunction with bar code symbol decoding module 521, which operates under control of system control module 511 to analyze digital scan data signals D2 (which are derived from the operation of a scanning platform and associated circuitry) to detect and decode bar code symbols on objects within the scanning field of the device 151", and produce and buffer symbol character data representative of the detected and decoded bar code symbols.

Figure 9A:
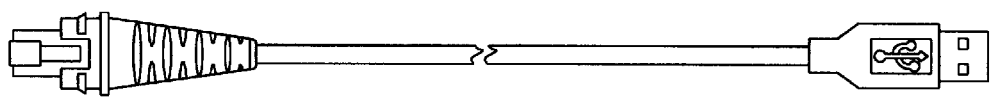
FIG. 9A is a pictorial illustration of an exemplary interface cable that uniquely supports a USB link between the bar code symbol reading device 151" of FIG. 5 and the USB port of a host system, including a 10-pin modular jack that plugs into the communication port 559 of the bar code symbol reading device 151" and USB A type connector that plugs into the USB port of the host system.
Figure 9B:
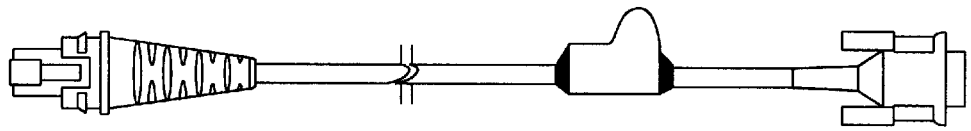
FIG. 9B is a pictorial illustration of an exemplary interface cable that uniquely supports an RS-232 link between the bar code symbol reading device 151" of FIG. 5 and the RS-232 (e.g., serial) port of a host system., including a 10-pin modular jack that plugs into the communication port 559 of the bar code symbol reading device 151" and 9-Pin D-Type connector that connects to the RS-232 serial port of the host system.
Figure 9C:
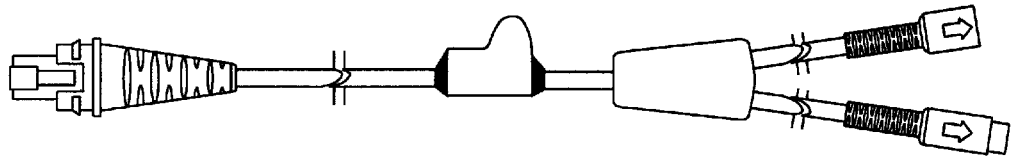
FIG. 9C is a pictorial illustration of an exemplary interface cable that uniquely supports an Keyboard Wedge link between the bar code symbol reading device 151" of FIG. 5 and the keyboard port of a host system (in addition to an Keyboard link between a keyboard attached thereto and the same keyboard port of the host system), including a 10-pin modular jack that plugs into the communication port 559 of the bar code symbol reading device 151" and a "Y" termination with a 5-pin DIN female connector on one end, and a 6-pin mini DIN male on the other; the DIN connectors are coupled to a keyboard and to the keyboard port of the host system.

During system configuration, the operator selects an interface cable that uniquely supports one of the three interfaces (e.g., either a USB cable, RS-232 cable or KBW cable) implemented by the data transmission subsystem 523, and couples the selected interface cable between port 559 and the corresponding interface port on the host system. Examples of such interface cables are shown in FIGS. 9A, 9B and 9C. For example, FIG. 5 illustrates that the operator has coupled a USB interface cable between port 559 of the device and the USB port of the host system. The dotted lines are meant to illustrate alternative coupling schemes (e.g., from the device 151" to host systems via the keyboard wedge interface/cable or the RS-232 interface/cable).

Figure 6A:
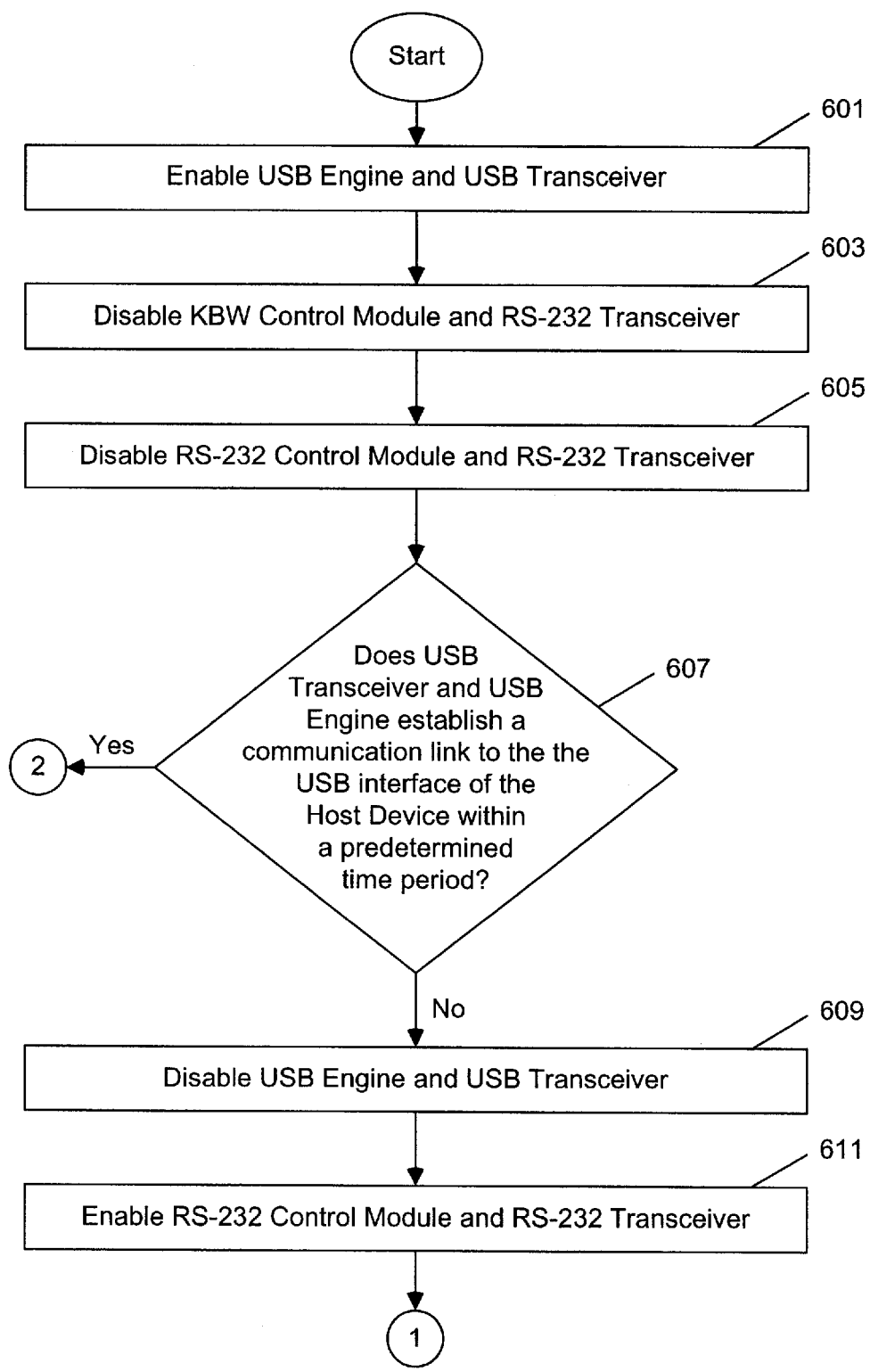
FIGS. 6A and 6B is a flow chart illustrating the operations of the communication control module 557 of FIG. 5 in the interface configuration mode whereby the three serial interfaces (e.g., USB, RS-232, and KBW) implemented by the data transmission subsystem 523 are automatically configured for operation.
Figure 6B:
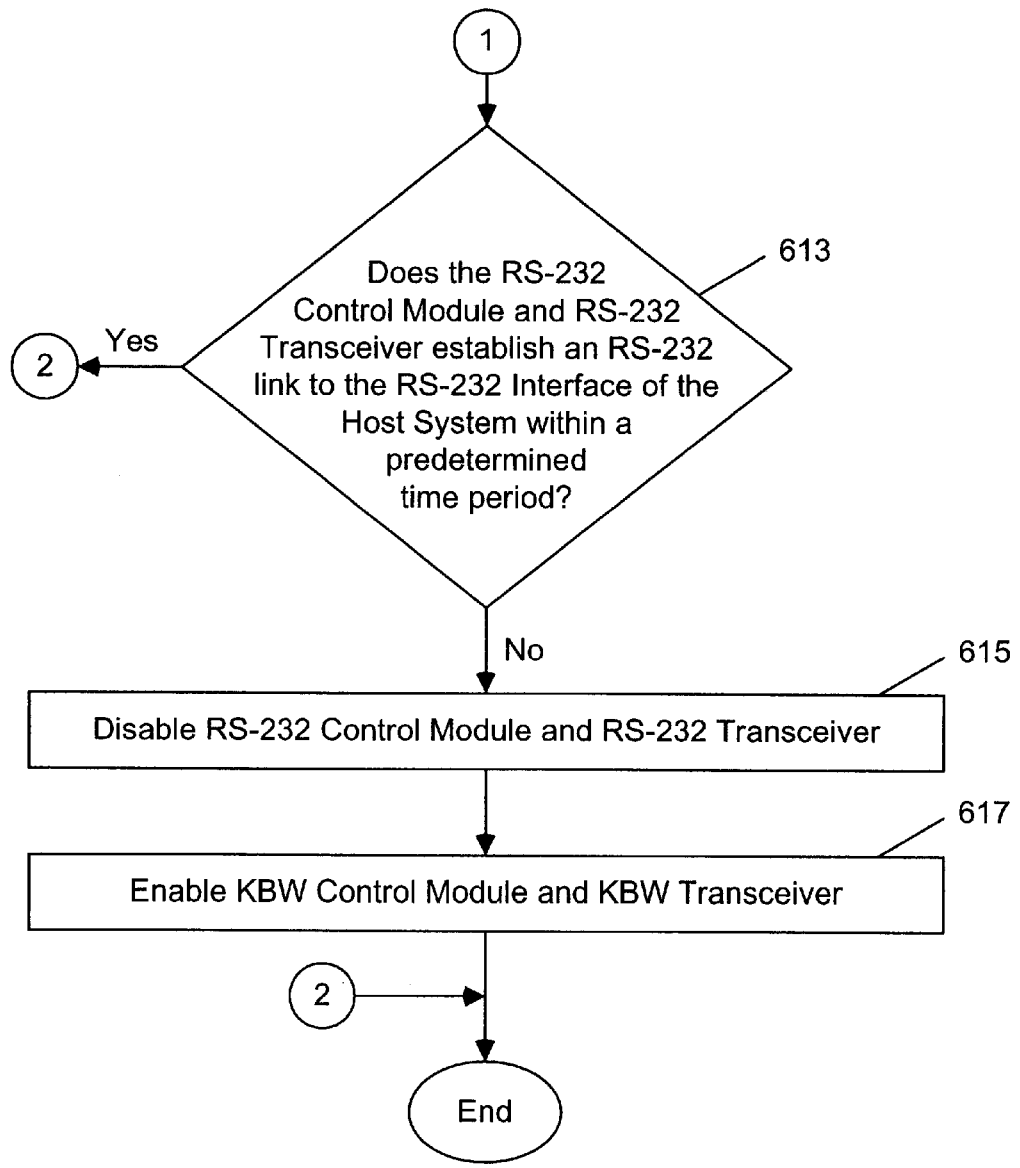

Upon detecting the occurrence of predetermined event (for example, system power up and initialization as described above), the system control module 511 controls the communication control module 557 to operate in the interface configuration mode (e.g., the interface Configuration State as described above) whereby the three serial interfaces (e.g., USB, RS-232, and KBW) implemented by the data transmission subsystem 523 are automatically configured for operation as illustrated in the flow chart of FIGS. 6A and 6B.

As shown, the interface configuration operation begins in steps 601–605 by enabling (i.e., activating) the USB interface circuitry (e.g., USB engine 551A and USB Transceiver 551B), disabling (i.e., de-activating) the RS-232 interface circuitry (e.g., RS-232 control 553A and RS-232 Transceiver 553B), and disabling (i.e., de-activating) the KBW interface circuitry (e.g., KBW control 555A and KBW Transceiver 555B). The operation then continues to step 607.

In step 607, the communication control module 557 determines whether the active USB interface circuitry (e.g., USB engine 551A and USB Transceiver 551B) of device 151" has established (or is in the process of establishing) a USB communication link to the USB interface of a host device within a first predetermined time period (for example, defined by a timer $T_{USB}$).

Typically, a USB link is established with an enumeration sequence as follows. First, the USB interface of the host system (for descriptive purposes referred to below as "Host System") sends a SETUP packet followed by a DATA packet to USB address 0 requesting the Device descriptor. The USB interface circuitry (e.g., USB engine 551A and USB Transceiver 551B) of device 151" receives and decode the request, and retrieves the requested Device descriptor from programmed memory. The Host System performs a control read sequence and the USB interface circuitry (e.g., USB engine 551A and USB Transceiver 551B) of device 151" responds by sending the Device Descriptor over the USB bus. After receiving the Device Descriptor, the Host System sends a SETUP packet followed by a DATA packet to address 0 assigning a new USB address to device 151". The USB interface circuitry (e.g., USB engine 551A and USB Transceiver 551B) of device 151" receives these packets and stores the new address in program memory (e.g., USB Device Address Register). The Host System sends a request for the Device descriptor using the new USB address. The USB interface circuitry (e.g., USB engine 551A and USB Transceiver 551B) of device 151" receives and decodes this request, and retrieves the requested Device descriptor from programmed memory. The Host System performs a control read sequence and the USB interface circuitry (e.g., USB engine 551A and USB Transceiver 551B) of device 151" responds by sending the Device Descriptor over the USB bus. This request/control read process is repeated to provide the Host System with the Configuration and Report descriptors. The Host System then sends a Set Configuration request. The USB interface circuitry (e.g., USB engine 551A and USB Transceiver 551B) of device 151" receives and decodes this request, thereby establishing the USB link between the device 151" and the Host System.

In this configuration, the operations of step 607 may be realized by communication between the communication control module 557 and the USB engine 551 to test whether this enumeration process is ongoing (or has completed). Such information is preferably provided to the communications control module 557 by reading the appropriate field in a Control Status Register (for example, the USB Control Endpoint Register), which is maintained by the USB engine 551 as this enumeration sequence is performed.

If, in step 607, the communication control module 557 determines that the active USB interface circuitry (e.g., USB engine 551A and USB Transceiver 551B) of device 151" has established (or is in the process of establishing) a USB communication link to the USB interface of a host device within the first predetermined time period, the interface configuration operations ends, thereby enabling data communication between the bar code symbol reading device 151" and the host system over the USB link therebetween. Otherwise the operation continues to step 609 and 611.

In steps 609 and 611, the USB interface circuitry (e.g., USB engine 551A and USB Transceiver 551B) is disabled (i.e., deactivated), and the RS-232 interface circuitry (e.g., RS-232 control 553A and RS-232 Transceiver 553B) is enabled (i.e., activated). Note that the KBW interface circuitry (e.g., KBW control 555A and KBW Transceiver 555B) remains disabled (i.e., de-activated). The operation then continues to step 613.

In step 613, the communication control module 557 determines whether the active RS-232 interface circuitry (e.g., RS-232 Control 553A and RS-232 Transceiver 553B) of device 151" has established (or is in the process of establishing) an RS-232 communication link to the RS-232 interface of a host device within a second predetermined time period (for example, defined by a timer $T_{RS-232}$).

Figure 7:
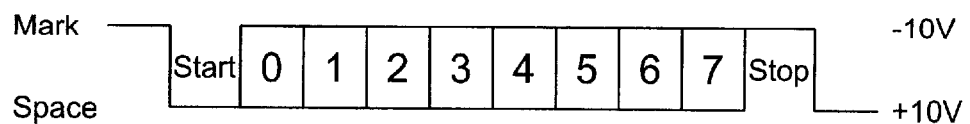
FIG. 7 is a pictorial illustration of a typical RS-232 waveform (in 8N1 format), which includes a Start Bit (Logic 0/Space/+10V), 8 Data bits (the least significant bit is sent first) and a Stop Bit (Logic 1/Mark/−10V); this waveform applies to the Transmit Data (TD) and Receive Data (RD) lines of the RS-232 interface.

An RS-232 communication link involves asynchronous serial communication (e.g., a clock signal is not sent with the data). Instead, each data word (8 bits) is synchronized using its start bit. As shown in FIG. 7, a typical RS-232 waveform (in 8N1 format) involves the Start Bit (Logic 0/Space/+10V), 8 Data bits (the least significant bit is sent first) and a Stop Bit (Logic 1/Mark/−10V). The data sent using this method is framed between the Start Bit and Stop Bit. This waveform applies to the Transmit Data (TD) and Receive Data (RD) lines of the RS-232 interface. There are other lines used to set-up and control communication over these two serial channels including the following:

i) Request to Send (RTS) line—informs the DCE (Scanning Device) that the DTE (Host System) is ready to exchange data;

ii) Clear to Send (CTS) line—informs the DTE (Host System) that the DCE (Scanning Device) is ready to exchange data;

iii) Data Set Ready (DSR) line—informs the DTE (Host System) that the DCE (Scanning Device) is ready to establish a link;

iv) Signal Ground (SG)—provides a common ground signal; and v) Data Terminal Ready (DTR) line—informs the DCE (Scanning Device) that the DCE (Host) is ready to establish a link.

These lines are also driven at RS-232 logic levels (e.g., +/−10 Volts). Note that the logic levels of such RS-232 signals are greater in magnitude than the logic levels of the other two interfaces. More specifically, the logic levels of the KBM interface and USB interface are both 0/5 Volts.

In this configuration, the operations of step 613 may be realized by communication between the communication control module 557 and the active RS-232 interface circuitry (e.g., RS-232 Control 553A and/or RS-232 Transceiver 553B) of device 151" to test the signal levels of one or more lines of the RS-232 interface (for example, the DTR line) to determine if such signal levels correspond to RS-232 logic levels (and thus do not correspond to the expected signal levels of a USB interface and KBW interface). For example, this determination can be accomplished by testing if the signal levels of one or more lines of the RS-232 interface (for example, the DTR line) is greater than 8.5 volts. If this test is positive, the signal levels correspond to the expected RS-232 logic levels and do not correspond to the expected signal levels of a USB interface and KBW interface.

If, in step 613, the communication control module 557 determines that the active RS-232 interface circuitry (e.g., RS-232 Control 553A and RS-232 Transceiver 553B) of device 151" has established (or is in the process of establishing) an RS-232 communication link to the RS-232 interface of a host device within a second predetermined time period, the interface configuration operations ends, thereby enabling data communication between the bar code symbol reading device 151" and the host system over the RS-232 link therebetween. Otherwise the operation continues to step 615 and 617.

In steps 615 and 617, the RS-232 interface circuitry (e.g., RS-232 control 553A and RS-232 Transceiver 553B) is disabled (i.e., deactivated) and the KBW interface circuitry (e.g., KBW control 555A and KBW Transceiver 555B) is enabled (i.e., activated) and the interface configuration operations end. Note that the USB interface circuitry (e.g., USB engine 551A and USB Transceiver 551B) remains disabled (i.e., de-activated). Such operation enables data communication between the bar code symbol reading device 151" and the host system over a KBW link therebetween.

Figure 8A:
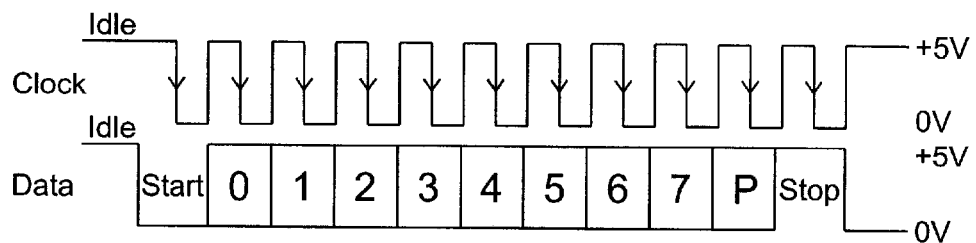
FIGS. 8A and 8B are pictorial illustrations of the waveforms implemented by a KBW interface (suitable for AT and PS/2-style keyboards; Communication from the KBW interface to the host system is shown in FIG. 8A; Communication from the host system to the KBW interface is shown in FIG. 8B.
Figure 8B:
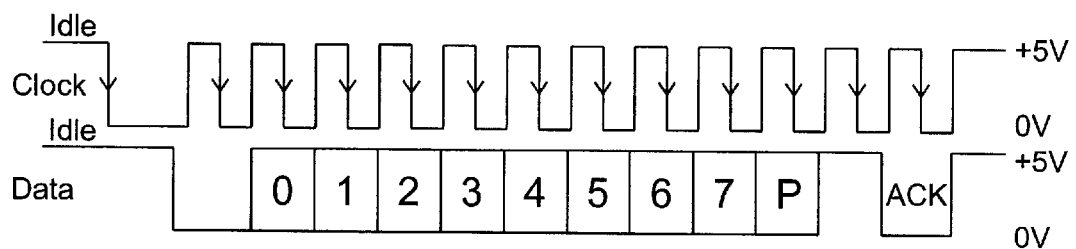

As shown in FIGS. 8A and 8B, the KBW interface for AT and PS/2-style keyboards implements a bi-directional protocol. The KBW interface can send data to the host system and the host system can send data to the KBW interface. The host system has the ultimate priority over direction. It can at anytime (although the not recommended) send a command to the KBW interface. The KBW interface is free to send data to the host system when both the KBD Data and KBD Clock lines are high (Idle). The KBD Clock line can be used as a Clear to Send line. If the host system takes the KBD Clock line low, the KBW interface will buffer any data until the KBD Clock is released (i.e., goes high). In the event that the host system takes the KBD Data line low, the KBW interface will prepare to accept a command from the host system.

Communication from the KBW interface to the host system is shown in FIG. 8A. The transmission of data in this forward direction (i.e., KBW interface to Host) is done with a frame of 11 bits. The first bit is a Start Bit (Logic 0) followed by 8 data bits (LSB First), one Parity Bit (Odd Parity) and a Stop Bit (Logic 1). Each bit should be read on the falling edge of the clock. The above waveform represents a one byte transmission from the KBW interface. The KBW interface may not generally change it's data line on the rising edge of the clock as shown in the diagram. The data line only has to be valid on the falling edge of the clock. The KBW interface will generate the clock. The frequency of the clock signal typically ranges from 20 to 30 KHz. The Least Significant Bit is always sent first.

Communication from the host system to the KBW interface is shown in FIG. 8B. The Host system initiates this communication by taking the KBD data line low. However, to prevent the KBW interface from sending data at the same time that the host system attempts to send data to the KBW interface, it is common to take the KBD Clock line low for more than 60 us. This is more than one bit length. Then the KBD data line is taken low, while the KBD clock line is released. The KBW interface will start generating a clock signal on it's KBD clock line. This process can take up to 10 mS. After the first falling edge has been detected, the Host system can load the first data bit on the KBD Data line. This bit will be read into the KBW interface on the next falling edge, after which the host system can place the next bit of data. This process is repeated for the 8 data bits. After the data bits come an Odd Parity Bit. Once the Parity Bit has been sent and the KBD Data Line is in a idle (High) state for the next clock cycle, the KBW interface acknowledges the reception of the new data. The KBW interface does this by taking the KBD Data line low for the next clock transition. If the KBD Data line is not idle after the 10th bit (Start, 8 Data bits+Parity), the KBW interface will continue to send a KBD Clock signal until the KBD Data line becomes idle.

As described above, the system control module 511 controls the communication control module 557 to operate in the interface configuration mode to automatically configure the interfaces of the data transmission subsystem 523. In addition, the system control module 511 provides an enable signal ($A_3$=1) to the bar code symbol reading module 521. In response thereto, the bar code symbol reading module 521 analyzes digital scan data signals D2 (which are derived from the operation of a scanning platform and associated circuitry) to detect and decode bar code symbols on objects within the scanning field of the device 151", produce bar code symbol character data representative of the detected and decoded bar code symbols, and automatically generate a third control activation signal $A_3$ indicative of a successful decoding operation (for example, $A_3$=0 is indicative that a successful decoding operation has not occurred, and $A_3$=1 is indicative that a successful decoding operation has occurred). As shown FIG. 5, the third control activation signal $A_3$ is provided to the system control module 511 for detection, analysis and programmed response.

The particular interface of the data transmission subsystem 52 which is enabled (e.g., activated) by the automatic interface configuration operations described above, is utilized for the communication of symbol character data from the device 151" to the host system. More specifically, under control of the system control module 511, this particular interface operates to automatically transmit symbol character data (produced by the operation of the bar code symbol reading module 521 as described above) to the host system over the communication link therebetween, if any.

Preferably, the operation of the particular interface in automatically transmitting such symbol character data occurs when the system control module 511 detects that either one of the following two conditions have been satisfied:

i) generation of the third control activation signal (e.g., $A_3$=1) within a predetermined time period, indicative that the bar code symbol has been read, and generation of data transmission control activation control signal (e.g., $A_4$=1) produced from data transmission activation switch 155 within a predetermined time frame, indicative that the user desires the produced bar code symbol character data to be transmitted to the host system or intended device; or ii) generation of the third control activation signal (e.g., $A_3$=1) within a predetermined time period, indicative that the bar code symbol has been read, and generation of fifth control activation signal $A_5$ (e.g., $A_5$=1).

151
Such control enables the bar code symbol reading device 151" to operate in automatic data transmission mode (e.g., $A_5$=1) as a hand-free presentation scanner whereby the operator passes objects and associated bar code symbols though the scanning field of the device 151" in order to automatically read the bar code symbols therein and automatically transmit corresponding bar code symbol character strings to the host system, and operate in the manually-activated data transmission mode (e.g., $A_5$=0) as a hands-on scanner whereby the operator positions the scanner so that an object and associated bar code symbol passes though the scanning field of the device 151" in order to automatically read the bar code symbol therein and then activate the transmission of the corresponding bar code symbol data string to the host computer upon timely manual activation (e.g., $A_4$=1) of the data transmission activation switch.

In an alternate embodiment, the mode select sensor 7 (and its associated control function in overriding the data transmission switch 155) can be omitted. In this case, the operation of the particular interface in automatically transmitting such symbol character data occurs when the system control module 511 detects that following condition has been satisfied: generation of the third control activation signal (e.g., $A_3$=1) within a predetermined time period, indicative that the bar code symbol has been read, and generation of data transmission control activation control signal (e.g., $A_4$=1) produced from data transmission activation switch 155 within a predetermined time frame, indicative that the user desires the produced bar code symbol character data to be transmitted to the host system or intended device. In this configuration, the device 151" is not capable of operating as a hand-free presentation scanner (whereby the operator passes objects and associated bar code symbols though the scanning field of the device in order to automatically read the bar code symbols therein and automatically transmit corresponding bar code symbol character strings to the host system), yet operates solely in a manually-activated data transmission mode as a hands-on scanner whereby the operator positions the scanner so that an object and associated bar code symbol passes though the scanning field of the device 151 in order to automatically read the bar code symbol therein and then activate the transmission of the corresponding bar code symbol data string to the host computer upon timely manual activation (e.g., $A_4$=1) of the data transmission activation switch 155'.

When operating in the manner described above, the data transmission subsystem 523 of bar code symbol reading device 151" is able to automatically configure itself such that its interface is suitable for communication to the communication interface of the host system. Moreover, the bar code symbol reading device 151" is capable of interfacing to a variety of different host devices in an automatic and error free manner with minimal human involvement, thus providing significant advantages over the prior art bar code symbol reading devices.

Preferably, the bar code symbol decode module 521, system control module 511, communication control module 557, USB engine 551A, RS-232 control 553A, and KBW control 555A are realized utilizing one or more programmed microprocessors (or microcontrollers) and accessible memory. For example, the CY7C637XX family of microcontrollers, which is available from Cypress Semiconductor, can be used to implement the USB engine and other control modules. The CY7C637XX family of microcontrollers are 8-bit RISC One Time Programmable (OTP) microcontrollers with embedded support for USB, PS/2 and serial communications, the details of which can be found at http://www.cypress.com/pub/datasheets/cy7c637xs.pdf.

FIG. 9A illustrates an exemplary interface cable that uniquely supports a USB link between the bar code symbol reading device 151" and the USB port of a host system. As shown, the interface cable includes a 10-pin modular jack that plugs into the communication port 559 of the bar code symbol reading device 151 and USB A type connector that plugs into the USB port of the host system.

FIG. 9B illustrates an exemplary interface cable that uniquely supports an RS-232 link between the bar code symbol reading device 151" and the RS-232 (e.g., serial) port of a host system. As shown, the interface cable includes a 10-pin modular jack that plugs into the communication port 559 of the bar code symbol reading device 151" and 9-Pin D-Type Connector that connects to the RS-232 serial port of the host system. Note that this cable has a built-in power jack that enables the operator to couple a power adapter thereto. Power from the power adapter is supplied via the interface cable to port 559 to the bar code symbol reading device 151" for distribution to the electrical components of the device 151".

FIG. 9C illustrates an exemplary interface cable that uniquely supports an Keyboard Wedge link between the bar code symbol reading device 151" and the keyboard port of a host system (in addition to an Keyboard link between a keyboard attached thereto and the same keyboard port of the host system. As shown, the interface cable includes a 10-pin modular jack that plugs into the communication port 559 of the bar code symbol reading device 151" and a "Y" termination with a 5-pin DIN female connector on one end, and a 6-pin mini DIN male on the other. The DIN connectors are coupled to a keyboard and to the keyboard port of the host system. Note that this cable has a built-in power jack that enables the operator to couple a power adapter thereto. Power from the power adapter is supplied via the interface cable to port 559 to the bar code symbol reading device 151" for distribution to the electrical components of the device 151".

Figure 10A:
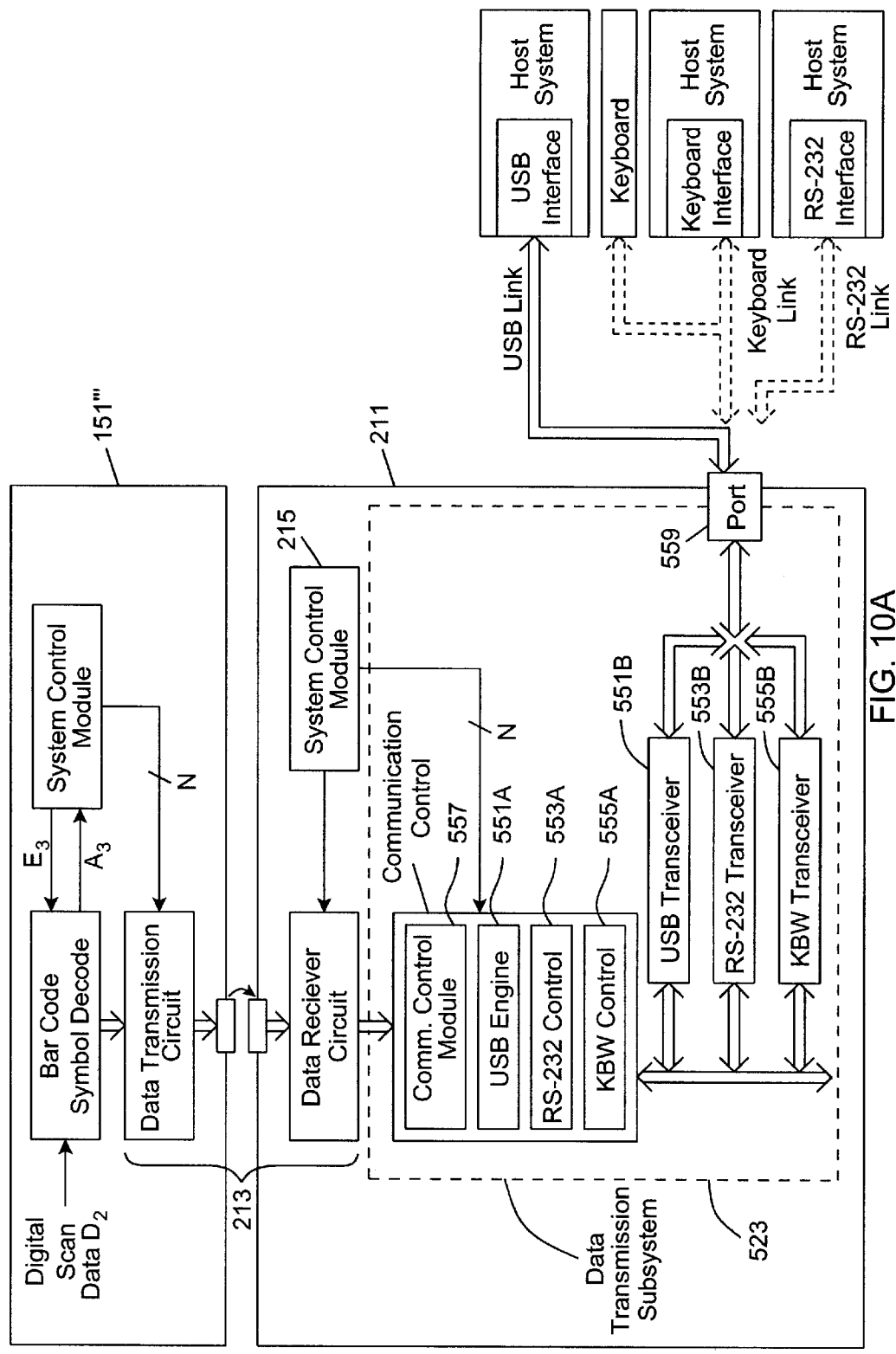
FIGS. 10A and 10B illustrate an alternative embodiment of the present invention Wherein a bar code symbol reading device 151''' is operably coupled to a base unit 211 by way of a communication link 213 therebetween; the base unit 211 may be used to mechanically support the bar code symbol reading device 151''' as illustrated in FIG. 10B or function solely as a communications interface adapter between the bar code symbol reading device 151''' and the host system; the base unit 211 includes an automatically-configurable data transmission subsystem 523 that supports automatic configuration of three exemplary wired serial interfaces (e.g., USB, RS-232, and KBW) to thereby enable communication between the base unit 211 and the host system.
Figure 10B:
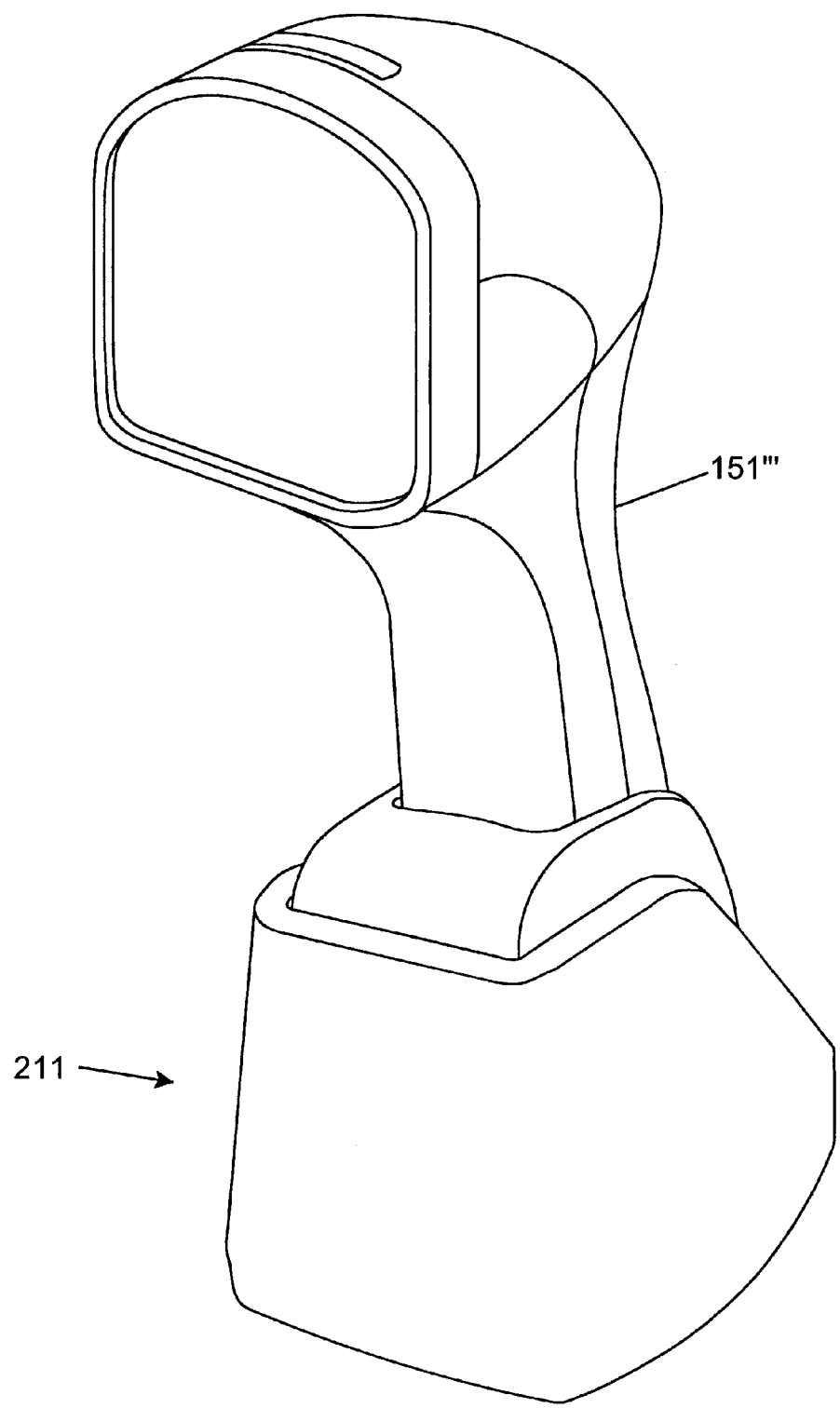

FIGS. 10A and 10B illustrate an alternative embodiment of the present invention wherein the bar code symbol reading device 151''' is operably coupled to a base unit 211 by way of a one way or two way communication link 213 therebetween. The communication link 213 may be a wireless link (such as an infra-red link, Bluetooth RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link). As shown in FIG. 10B, the base unit 211 mechanically supports the bar code symbol reading device 151''' when the bar code symbol reading device 151''' is removably placed therein. Alternatively, the base unit 211 may not be used to mechanically support the bar code symbol reading device 151''', yet function as a communications interface adapter between the bar code symbol reading device 151''' and the host system.

As shown, the base unit 211 includes the automatically-configurable data transmission subsystem 523 as described above that supports automatic configuration of three exemplary wired serial interfaces (e.g., USB, RS-232, and KBW). During system configuration, the operator selects an interface cable that uniquely supports one of the three interfaces (e.g., either a USB cable, RS-232 cable or KBW cable) implemented by the data transmission subsystem 523, and couples the selected interface cable between port 559 and the corresponding interface port on the host system. Examples of such interface cables are shown in FIGS. 9A, 9B and 9C. For example, FIG. 5 illustrates that the operator has coupled a USB interface cable between port 559 of the device and the USB port of the host system. The dotted lines are meant to illustrate alternative coupling schemes (e.g., from the device 151" to host systems via the keyboard wedge interface/cable or the RS-232 interface/cable).

Upon detecting the occurrence of programmed event (for example, system power up and initialization), the system control module 215 controls the communication control module 557 to operate in the interface configuration mode (e.g., the Interface Configuration State as described above) whereby the three serial interfaces (e.g., USB, RS-232, and KBW) implemented by the data transmission subsystem 523 are automatically configured for operation as illustrated in the flow chart of FIGS. 6A and 6B. After the completion of such automatic configurations, one of the three serial interfaces of the base unit is activated, and the other two interfaces are disabled.

After each successful reading of a bar code symbol by the bar code symbol reading device 151''', symbol character data (representative of the read bar code symbol) is generated and then subsequently produces symbol character data collected from the same read bar code symbol is automatically transmitted to the base unit by way of the communication link 213. And the base unit 211 forwards such data to the host system over the interface activated during the interface configuration operations of the base unit.

In this manner, the data transmission subsystem of base unit 211 is able to automatically configure itself such that its interface is suitable for communication to the communication interface of the host system. Moreover, the bar code symbol reading device and base unit is thus capable of interfacing to a variety of different host devices in an automatic and error free manner with minimal human involvement, thus providing significant advantages over the prior art bar code symbol reading devices.

As described herein, the present invention is embodied in a hand-holdable laser scanning bar code symbol reading device. However, the present invention is not limited in this respect and can be readily adapted for use in any bar code symbol reading system that reads bar code symbols (including one-dimensional and two-dimensional barcodes of any format) affixed to objects proximate thereto, produces symbol character data representative of such bar codes, and transmits such symbol character data to a host system. Advantageously, the present invention enables automatic configuration of communication between the bar code symbol reading system and the host device. Moreover, the bar code symbol reading system is thus capable of interfacing to a variety of different host devices in an automatic and error free manner with minimal human involvement, thus providing significant advantages over the prior art bar code symbol reading devices. Applicable bar code reading systems include laser-based presentation bar code reading systems, laser-based in-counter bar code reading systems, laser-based wearable bar code reading systems, wand-type bar code reading system as described in U.S. Pat. No. 3,991,299 to Chadina, Jr. et al., herein incorporated by reference in its entirety, and hand-holdable (or presentation or in-counter and wearable) CCD-based bar code symbol reading devices that illuminate the bar code scanning field with an LED light source (or other flash light source) as described in U.S. Pat. Nos. 5,932,862 to Hussey et al., 5,780,834 to Havens et al., and 5,723,853 to Longacre, Jr. et al., herein incorporated by reference in their entirety, and hand-holdable (or presentation or in-counter and wearable) CCD-based bar code symbol reading devices that illuminate the bar code scanning field with a planar laser illumination beam (PLIM) as described in U.S. patent application Ser. No. 09/954,477, entitled "Method and System for Producing Digital Images of Objects With Substantially Reduced Speckle-Noise Power By Illuminating Said Objects with Wavefront-Controlled Planar Laser Illumination Beams", filed Sep. 17, 2001, herein incorporated by reference in its entirety.

It is understood that the bar code symbol reading systems (including the laser scanning modules, laser scanning engines, and control schemes) of the illustrative embodiments as described above may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the claims to Invention appended hereto.

We claim:

1. A bar code symbol reading device comprising:

a bar code symbol reading engine for reading bar code symbols affixed to objects proximate to said bar code symbol reading engine and producing symbol character data representative of such bar code symbols; and a data transmission subsystem, operably coupled to said bar code reading engine, for communicating said symbol character data to a communication interface of a host system over a communication link therebetween;

wherein said data transmission subsystem implements a plurality of different communication interfaces, and wherein, during an interface configuration mode of operation, said data transmission subsystem automatically cycles though at least one of said plurality of different communication interfaces, whereby, for a given communication interface, said data transmission subsystem selectively activates the given communication interface while disabling the other communication interfaces and tests the communication link between the given communication interface and the host system to ascertain if the given communication interface corresponds to the communication interface of the host system.

2. The bar code symbol reading device of claim 1, wherein said interface configuration mode of operation is carried out when the device is initially powered up.

3. The bar code symbol reading device of claim 1, wherein, in said interface configuration mode of operation, upon detecting that said given communication interface corresponds to the communication interface of the host system, the interface configuration mode of operation ends, thereby enabling subsequent data communication between said bar code symbol reading device and the host system over the given communication interface.

4. The bar code symbol reading device of claim 1, wherein said host system is selected from the group comprising: an electronic cash register system, a data collection device, and a data storage and/or processing device.

5. The bar code symbol reading device of claim , wherein at least one communication interface implemented by said data transmission system and the communication interface of the host system provides a wireless data link between the device and the host system.

6. The bar code symbol reading device of claim 5, wherein said wireless data link is selected from the group comprising: an infra-red link, a Bluetooth RF link, and an IEEE 802.11b RF link.

7. The bar code symbol reading device of claim 1, wherein at least one communication interface implemented by said data transmission system and the communication interface of the host system provides a wired serial data link between the device and the host system.

8. The bar code symbol reading device of claim 7, wherein said wired serial data link is selected from the group comprising: a keyboard wedge link, an RS-232 link, USB link, an IEEE 1394 link, an RS-422 link, and a RS-485 link.

9. The bar code symbol reading device of claim 1, wherein at least one communication interface implemented by said data transmission system and the communication interface of the host system provides a wired parallel data bus.

10. The bar code symbol reading device of claim 1, wherein at least one communication interface implemented by the data transmission system of the device and the communication interface of the host system provides a wired communication link selected from the group comprising: an OCIA link, an IBM 46XX link, a Light Pen Emulation link, and a LTPN link.

11. The bar code symbol reading device of claim 1, wherein the reading of a bar code symbol and subsequent communication of the symbol character data corresponding thereto to the host system occurs automatically without the need for human interaction to activate such operations.

12. The bar code symbol reading device of claim 1, wherein the reading of the bar code symbol occurs automatically without the need for human interaction to activate such operation, and the subsequent transfer of the symbol data corresponding thereto to the host system is manually-activated by a user interacting with a data transmission switch.

13. The bar code symbol reading device of claim 1, wherein the reading of the bar code symbol and the subsequent transfer of the symbol character data corresponding thereto to the host system is manually-activated by a user interaction with a trigger mechanism.

14. The bar code symbol reading device of claim 1, wherein said data transmission subsystem maintains a status register that stores information related to the establishment of a communication link between said data transmission subsystem and the host system over a specific interface implemented by said data transmission subsystem, and wherein, in the interface configuration mode of operation, said data transmission subsystem reads said information stored in said status register to ascertain if the given communication interface corresponds to the communication interface of the host system.

15. The bar code symbol reading device of claim 1, wherein, in the interface configuration mode of operation, said data transmission subsystem tests the signal levels of a given communication interface to ascertain if the given communication interface corresponds to the communication interface of the host system.

16. The bar code symbol reading device of claim 1, wherein said bar code symbol reading engine is selected from the group comprising: a laser-based bar code reading system, a CCD-based bar code symbol reading devices that illuminate the bar code scanning field with an LED light source, and a CCD-based bar code symbol reading devices that illuminate the bar code scanning field with a planar laser illumination beam.

17. The bar code symbol reading device of claim 1, for use as a hand-holdable scanner.

18. The bar code symbol reading device of claim 1, for use as a presentation scanner.

19. The bar code symbol reading device of claim 1, for use as an in-counter scanner.

20. The bar code symbol reading device of claim 1, for use as a wearable scanner.

21. A method of automatically configuring data communication between a bar code symbol reading engine capable of reading bar code symbols and producing symbol character data representative thereof, and a host system operably associated with said bar code symbol reading engine, said method comprising:

providing a data transmission subsystem, operably coupled to the bar code reading engine, for implementing a plurality of different communication interfaces; and during an interface configuration mode of operation, controlling said data transmission subsystem to automatically cycle though at least one of said plurality of different communication interfaces, whereby, for a given communication interface, said data transmission subsystem selectively activates the given communication interface while disabling the other communication interfaces, and tests the communication link between the given communication interface and the host system so as to ascertain if the given communication interface corresponds to the communication interface of the host system.

22. The method of claim 21, wherein said interface configuration mode of operation is carried out when the device is initially powered up.

23. The method of claim 21, wherein, in said interface configuration mode of operation, upon detecting that said given communication interface corresponds to the communication interface of the host system, ending the interface configuration mode of operation, thereby enabling subsequent data communication between said bar code symbol reading engine and the host system over the given communication interface.

24. The method of claim 21, wherein said host system is selected from the group comprising: an electronic cash register system, a data collection device, and a data storage and/or processing device.

25. The method of claim 21, wherein at least one communication interface implemented by said data transmission system of the device and the communication interface of the host system provides a wireless data link between the device and the host system.

26. The method of claim 25, wherein said wireless data link is selected from the group comprising: an infra-red link, a Bluetooth RF link, and an IEEE 802.11b RF link.

27. The method of claim 21, wherein at least one communication interface implemented by said data transmission system of the device and the communication interface of the host system provides a wired serial data link between the device and the host system.

28. The method of claim 27, wherein said wired serial data link is selected from the group comprising: a keyboard wedge link, an RS-232 link, USB link, an IEEE 1394 link, an RS-422 link, and a RS-485 link.

29. The method of claim 21, wherein at least one communication interface implemented by said data transmission system of the device and the communication interface of the host system provides a wired parallel data bus.

30. The method of claim 21, wherein at least one communication interface implemented by said data transmission system of the device and the communication interface of the host system provides a wired communication link selected from the group comprising: an OCIA link, an IBM 46XX link, a Light Pen Emulation link, and a LTPN link.

31. The method of claim 21, wherein the reading of a bar code symbol and subsequent communication of the symbol character data corresponding thereto to the host system occurs automatically without the need for human interaction to activate such operations.

32. The method of claim 21, wherein the reading of the bar code symbol occurs automatically without the need for human interaction to activate such operation, and the subsequent transfer of the symbol data corresponding thereto to the host system is manually-activated by a user interacting with a data transmission switch.

33. The method of claim 21, wherein the reading of the bar code symbol and the subsequent transfer of the symbol character data corresponding thereto to the host system is manually-activated by a user interaction with a trigger mechanism.

34. The method of clam 21, further comprising the step of maintaining a status register that stores information related to the establishment of a communication link between said data transmission subsystem and the host system over a specific interface implemented by said data transmission subsystem, and wherein, in the interface configuration mode of operation, said data transmission subsystem reads said information stored in said status register so as to ascertain if the given communication interface corresponds to the communication interface of the host system.

35. The method of claim 21, further comprising the step of:: in the interface configuration mode of operation, controlling said data transmission subsystem to test the signal levels of the given communication interface and the host system to ascertain if the given communication interface corresponds to the communication interface of the host system.

36. The method of claim 21, wherein said bar code symbol reading engine is selected from the group comprising: a laser-based bar code reading system, a CCD-based bar code symbol reading devices that illuminate the bar code scanning field with an LED light source, and a CCD-based bar code symbol reading devices that illuminate the bar code scanning field with a planar laser illumination beam.

37. The method of claim 21, wherein said bar code symbol reading engine is a hand-holdable scanner.

38. The method of claim 21, wherein said bar code symbol reading engine is a presentation scanner.

39. The method of claim 21, wherein said bar code symbol reading engine is an in-counter scanner.

40. The method of claim 21, wherein said bar code symbol reading engine is a wearable scanner.

41. The method of claim 21, wherein an operator selects an interface cable that uniquely supports one of the plurality of different interfaces implemented by said data transmission system and operably couples the interface cable between said bar code symbol reading device and the host system.

42. A bar code symbol reading system comprising:
a host system;
a bar code symbol reading device including a bar code symbol reading engine for reading bar code symbols affixed to objects proximate to said bar code reading engine and producing symbol character data representative of such bar code symbols;
a data transmission subsystem, operably coupled between said bar code reading engine and the host system, for communicating said symbol character data to a communication interface of a host system over a communication link therebetween,
wherein said data transmission subsystem implements a plurality of different communication interfaces, and
wherein, during an interface configuration mode of operation, the data transmission subsystem automatically cycles though at least one of said plurality of different communication interfaces,
whereby, for a given communication interface, said data transmission subsystem selectively activates the given communication interface while disabling the other communication interfaces, and tests the communication link between the given communication interface and the host system so as to ascertain if the given communication interface corresponds to the communication interface of the host system.

43. The bar code symbol reading system of claim 42, wherein said interface configuration mode of operation is carried out when the device is initially powered up.

44. The bar code symbol reading system of claim 42, wherein, in said interface configuration mode of operation, upon detecting that said given communication interface corresponds to the communication interface of the host system, the interface configuration mode of operation ends, thereby enabling subsequent data communication between the bar code symbol reading device and the host system over the given communication interface.

45. The bar code symbol reading system of claim 42, for use as a point of sale system, a data collection device, or a data storage and/or processing device.

46. The bar code symbol reading system of claim 42, wherein at least one communication interface implemented by said data transmission system of the device and the communication interface of the host system provides a wireless data link between the device and the host system.

47. The bar code symbol reading system of claim 46, wherein said wireless data link is selected from the group comprising: an infra-red link, a Bluetooth RF link, and an IEEE 802.11b RF link.

48. The bar code symbol reading system of claim 42, wherein at least one communication interface implemented by said data transmission system of the device and the communication interface of the host system provides a wired serial data link between the device and the host system.

49. The bar code symbol reading system of claim 48, wherein said wired serial data link is selected from the group comprising: a keyboard wedge link, an RS-232 link, USB link, an IEEE 1394 link, an RS-422 link, and a RS-485 link.

50. The bar code symbol reading system of claim 42, wherein at least one communication interface implemented by said data transmission system of the device and the communication interface of the host system provides a wired parallel data bus.

51. The bar code symbol reading system of claim 42, wherein at least one communication interface implemented by said data transmission system of the device and the communication interface of the host system provides a wired communication link selected from the group comprising: an OCIA link, an IBM 46XX link, a Light Pen Emulation link, and a LTPN link.

52. The bar code symbol reading system of claim 42, wherein the reading of a bar code symbol and subsequent communication of the symbol character data corresponding thereto to the host system occurs automatically without the need for human interaction to activate such operations.

53. The bar code symbol reading system of claim 42, wherein the reading of the bar code symbol occurs automatically without the need for human interaction to activate such operation, and the subsequent transfer of the symbol data corresponding thereto to the host system is manually-activated by a user interacting with a data transmission switch.

54. The bar code symbol reading device of claim 42, wherein the reading of the bar code symbol and the subsequent transfer of the symbol data corresponding thereto to the host system is manually-activated by a user interacting with a trigger mechanism.

55. The bar code symbol reading system of claim 42, wherein said data transmission subsystem maintains a status register that stores information related to the establishment of a communication link between said data transmission subsystem and the host system over a specific interface implemented by said data transmission subsystem, and wherein, in the interface configuration mode of operation, said data transmission subsystem reads said information stored in said status register to ascertain if the given communication interface corresponds to the communication interface of the host system.

56. The bar code symbol reading system of claim 42, wherein, in the interface configuration mode of operation, said data transmission subsystem tests the signal levels of the given communication interface and the host system so as to ascertain if the given communication interface corresponds to the communication interface of the host system.

57. The bar code symbol reading system of claim 42, wherein said bar code symbol reading engine is selected from the group comprising: a laser-based bar code reading system, a CCD-based bar code symbol reading devices that illuminate the bar code scanning field with an LED light source, and a CCD-based bar code symbol reading devices that illuminate the bar code scanning field with a planar laser illumination beam.

58. The bar code symbol reading system of claim 42, wherein said bar code symbol reading device comprises a hand-holdable scanner.

59. The bar code symbol reading system of claim 42, wherein said bar code symbol reading device comprises a presentation scanner.

60. The bar code symbol reading system of claim 42, wherein said bar code symbol reading device comprises an in-counter scanner.

61. The bar code symbol reading system of claim 42, wherein said bar code symbol reading device comprises a wearable scanner.

* * * * *